Figure 1:
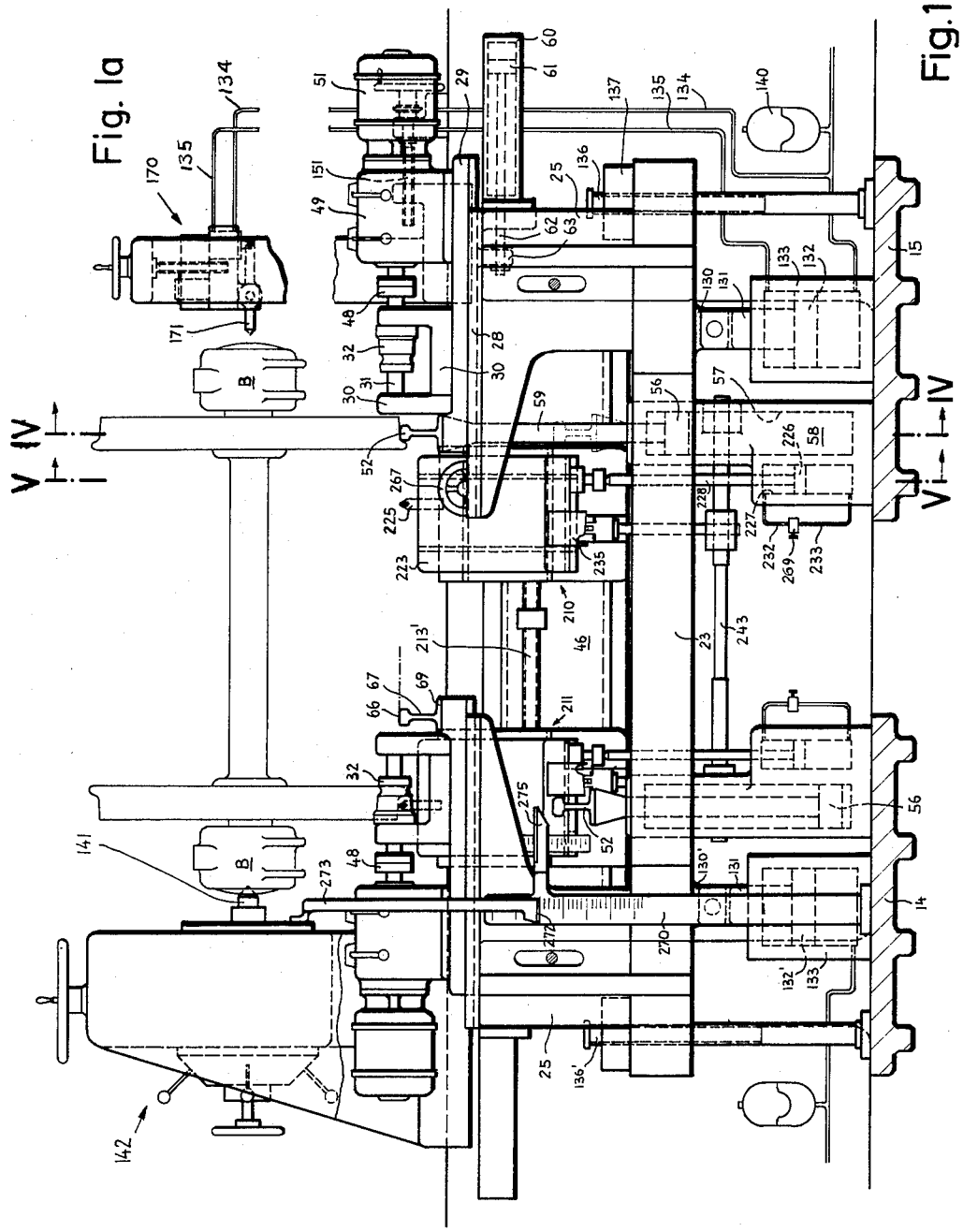

Aug. 31, 1965  T. DOMBROWSKI  3,203,286
UNDERFLOOR LATHE FOR RECONDITIONING RAILWAY VEHICLE WHEELS
Filed Aug. 14, 1961  21 Sheets-Sheet 1

THEODOR DOMBROWSKI
INVENTOR

Aug. 31, 1965 T. DOMBROWSKI 3,203,286
UNDERFLOOR LATHE FOR RECONDITIONING RAILWAY VEHICLE WHEELS
Filed Aug. 14, 1961 21 Sheets-Sheet 6

THEODOR DOMBROWSKI
INVENTOR

Aug. 31, 1965     T. DOMBROWSKI     3,203,286
UNDERFLOOR LATHE FOR RECONDITIONING RAILWAY VEHICLE WHEELS
Filed Aug. 14, 1961     21 Sheets-Sheet 8

Aug. 31, 1965  T. DOMBROWSKI  3,203,286
UNDERFLOOR LATHE FOR RECONDITIONING RAILWAY VEHICLE WHEELS
Filed Aug. 14, 1961  21 Sheets-Sheet 12

THEODOR DOMBROWSKI
INVENTOR

Aug. 31, 1965    T. DOMBROWSKI    3,203,286
UNDERFLOOR LATHE FOR RECONDITIONING RAILWAY VEHICLE WHEELS
Filed Aug. 14, 1961    21 Sheets-Sheet 14

THEODOR DOMBROWSKI
INVENTOR

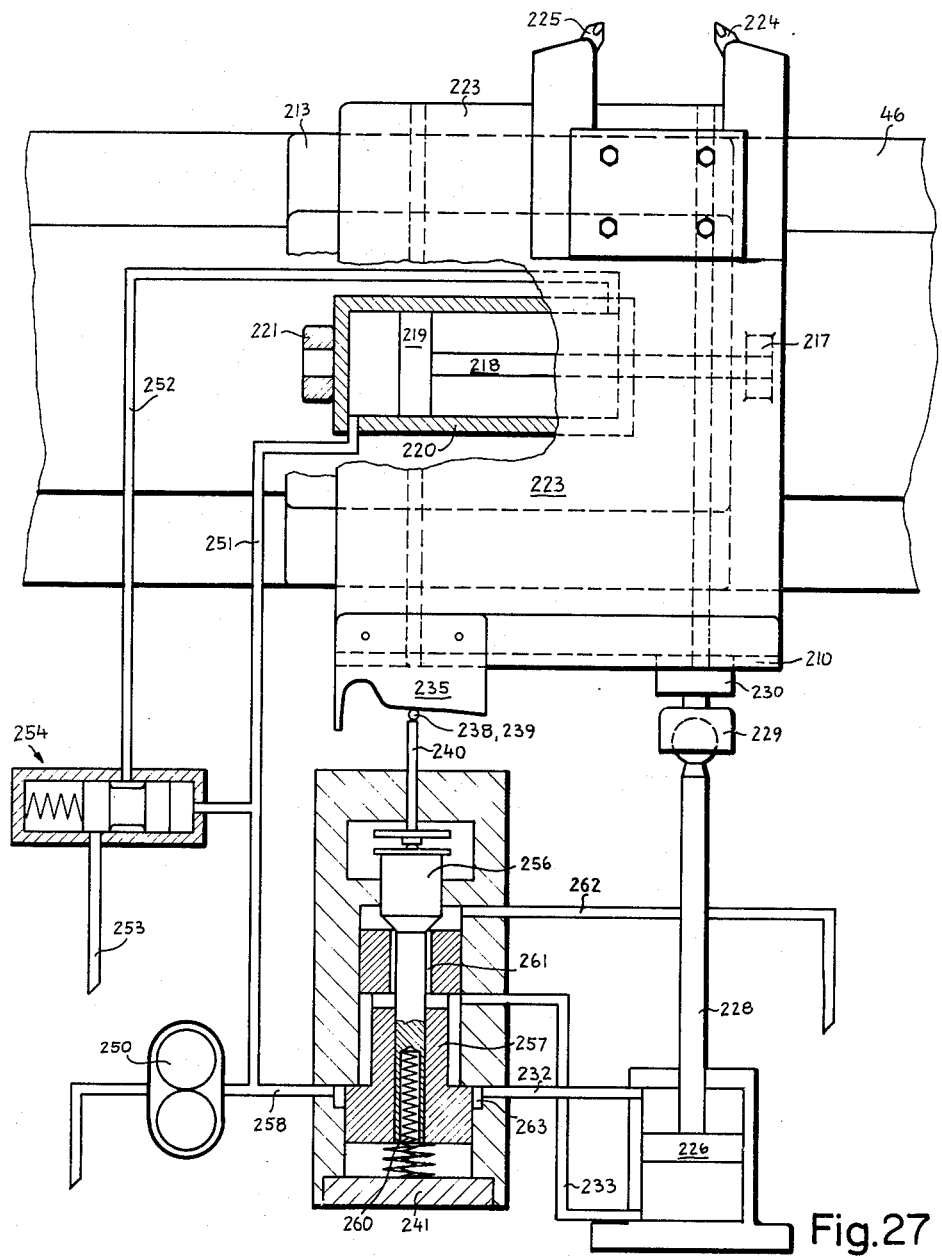

United States Patent Office 3,203,286
Patented Aug. 31, 1965

3,203,286
UNDERFLOOR LATHE FOR RECONDITIONING RAILWAY VEHICLE WHEELS
Theodor Dombrowski, Erkelenz, Rhineland, Germany, assignor to Wilhelm Hegenscheidt Kommanditgesellschaft, Erkelenz, Rhineland, Germany, a partnership of Germany
Filed Aug. 14, 1961, Ser. No. 137,454
Claims priority, application Germany, Aug. 16, 1960, H 40,221; Nov. 24, 1960, H 41,037; Mar. 2, 1961, H 41,899
12 Claims. (Cl. 82—14)

My invention relates to an underfloor lathe for reconditioning the peripheral surfaces of a wheel or a set of wheels of a railway vehicle in assembled condition and, more particularly, to a lathe of this type in which the vehicle is driven on rails upon the lathe, which is located in a pit under floor level below the rails, whereupon sections of the rails are removed and the wheel or the set of wheels to be re-conditioned is supported, centered, and rotated by a pair of driven supporting rollers forming part of the lathe. In this operation the set of wheels can be held between stationary centers or may be machined in an centerless manner. The centerless machining operation is preferred where the wear of the peripheral surfaces of the wheel or set of wheels is moderate. As in this centerless operation each wheel is supported on its periphery, it may happen, owing to uneven wear or to a deformation of the axle, that the wheel is held in an eccentric position with respect to the original axis of the set of wheels. Therefore, heretofore this centerless method was not applicable unless the flange surface of the wheel, as distinguished from the tread surface, was not substantially worn on its periphery and was still circular and coaxial to the axis and, therefore, could be employed to support and rotate the wheel during the machining operation in accurately centered position.

Where the flanges of the wheel are considerably worn off, however, so that the peripheral flange surface is seriously affected and not fit to properly support the wheel for the reconditioning operation, the set of wheels must be held between centers during the cutting operation. This requires rugged tail stocks and a resilient mounting of the driving rollers permitting these rollers to maintain frictional engagement with the non-circular or eccentric peripheries of the wheels.

It is an imperative requirement in an underfloor lathe of the type described hereinabove that the set of wheels is properly supported by suitable props, before the rail sections of the track, on which the vehicle is driven into position above the lathe, can be removed. This removal is necessary, however, before the driving and supporting rollers can be engaged with the set of wheels preparatory to the machining operation. The props, suitable mechanism for removing the wheel sections, and means for effecting the engagement of the supporting rollers with the set of wheels to be re-conditioned must be disposed within the pit and must be of rugged construction.

Therefore, it is the primary object of my invention to provide an improved underfloor lathe of the type indicated hereinabove In which the centerless re-conditioning method is applicable to wheels of poor condition and still results in greater accuracy than obtainable heretofore;

In which a holder for the supporting rollers, the tool support, a jack for lifting, propping up and lowering the set of wheels and for moving the rail sections into and out of operative position are disposed in a compact arrangement within the pit without, however, obstructing easy access to the tool for close inspection of the re-conditioning work;

In which the supporting rollers or the tool holder can be so controlled as to prevent an eccentric or a non-circular condition of the periphery of the railway wheels from affecting the distance between the tool and the axis of the set of wheels;

In which during the cutting operation the vehicle and its set of wheels is securely held and centered in position transversely as well as longitudinally;

In which the same tool support and the same wheel supporting means are employed in both the centerless machining method and the conventional method in which the set of wheels is held between stationary coaxial centers;

In which the supporting rollers, the means for driving and axially displacing same, jacks for lifting, propping up and lowering the set of wheels, the tool support, and means for stabilizing the tool holder with respect to the level of the axis of the set of wheels are disposed within the pit in a minimum of space without any mutual interference.

It is a further object of my invention ot provide improved measuring means applicable to the centerless method for measuring the diameters of the wheels during the re-conditioning operation, and improved means for measuring the relative altitudes of the centers, and the consequent relationship of the diameters of the wheels of the set when the conventional method of re-conditioning the set of wheels between such centers is employed.

Further objects of my invention will appear from a detailed description of a preferred embodiment thereof with reference to the accompanying drawings in which such embodiment is illustrated by way of example. It is to be understood, however, that my invention is in no way limited to such details and that the phrases and terms used in such description have been chosen for the purpose of explaining rather than that of restricting or limiting my invention.

With the aforesaid objects in view, the invention consists in the novel combinations and arrangements of parts hereinafter described in their preferred embodiments, pointed out in the subjoined claims and illustrated in the annexed drawings, wherein like parts are designated by the same reference characters throughout the several views.

Figure 2:
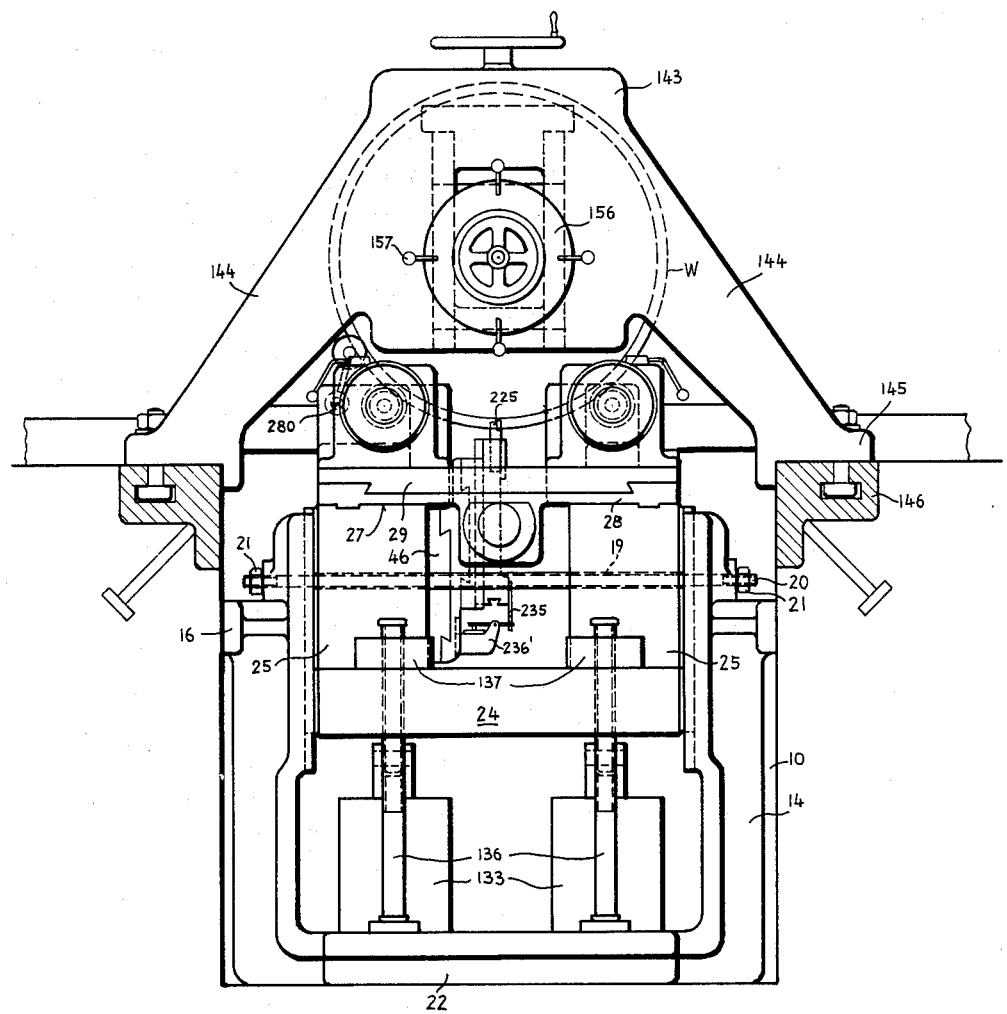
Figure 3:
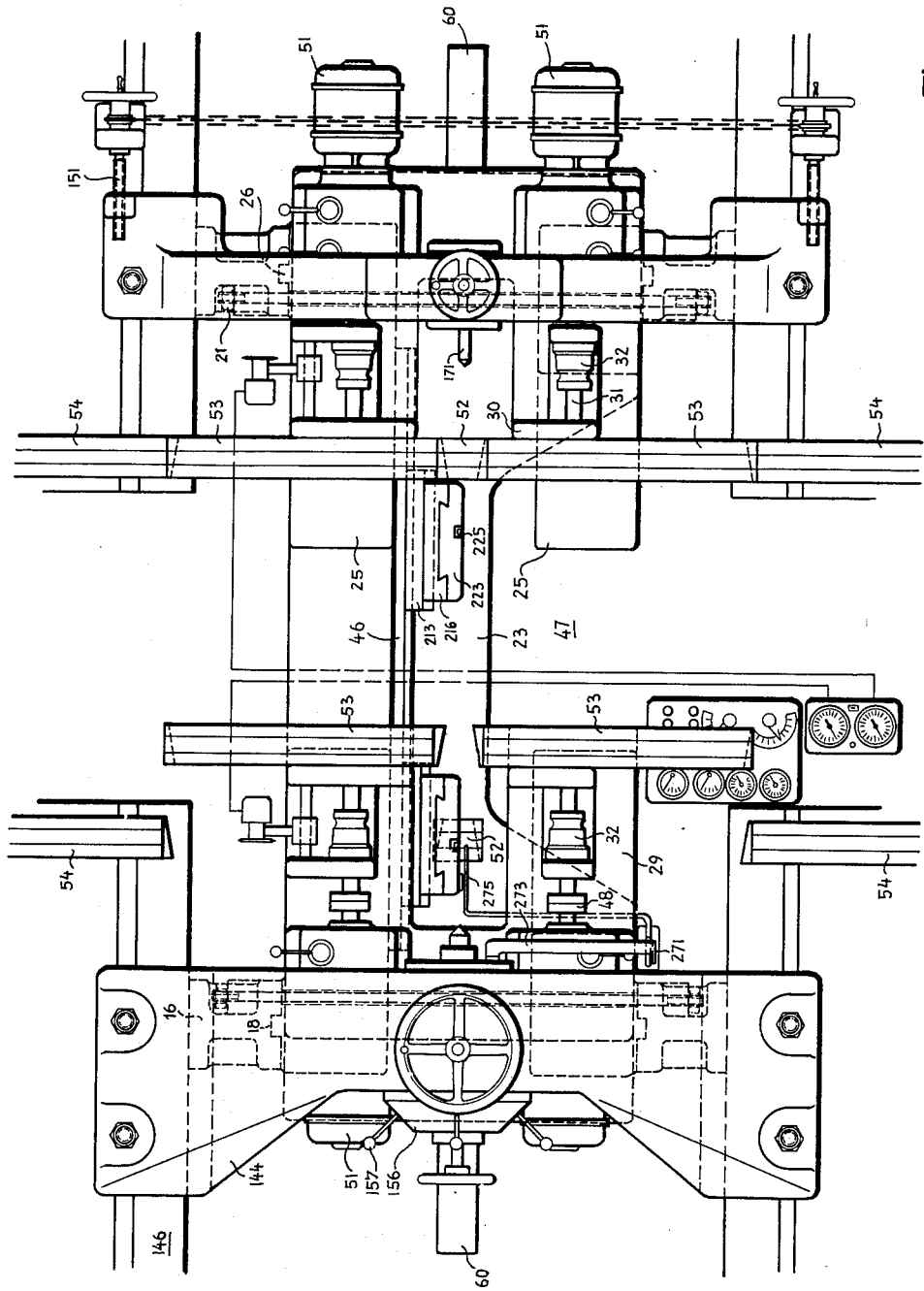
Figure 4:
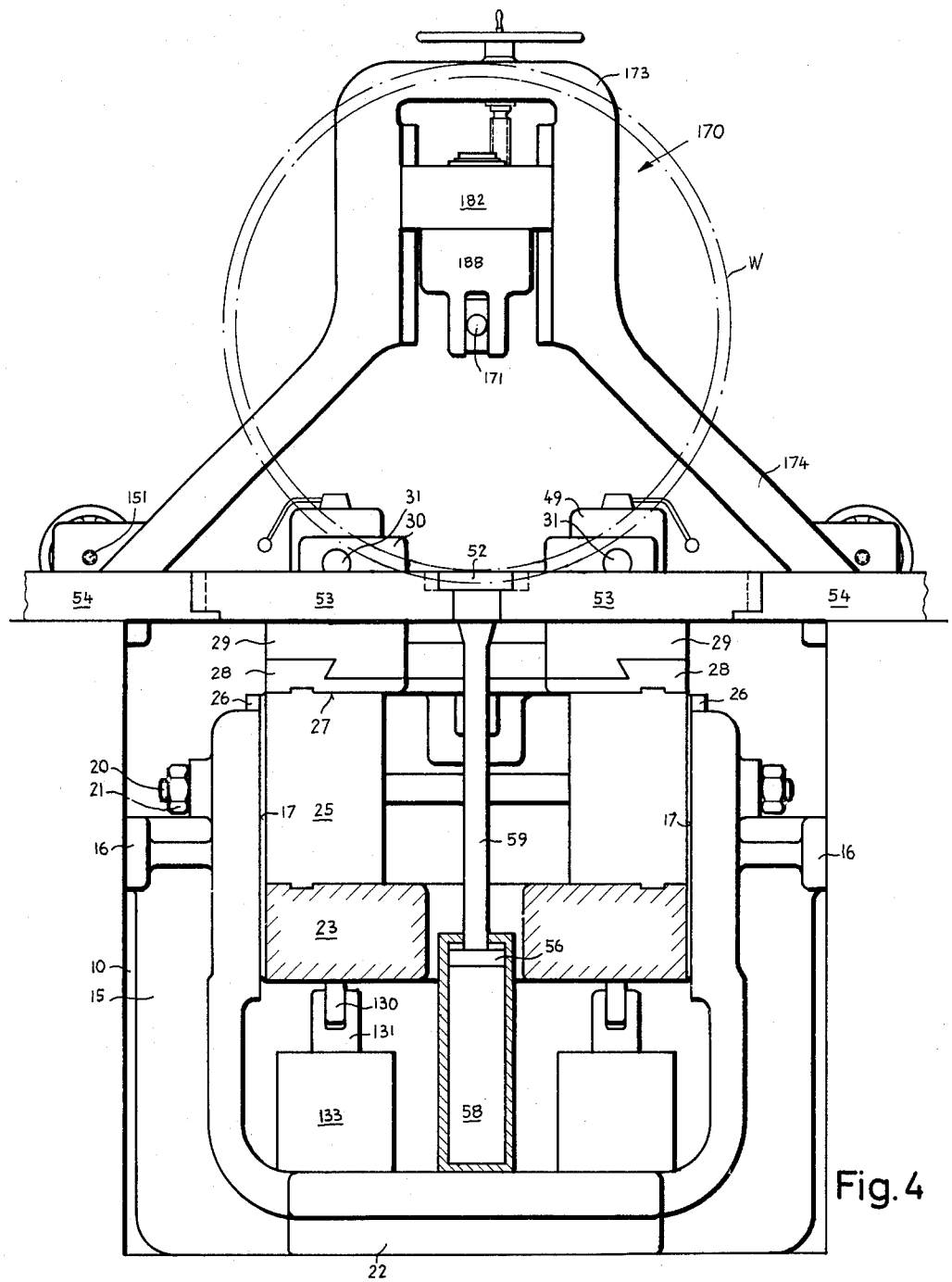
Figure 5:
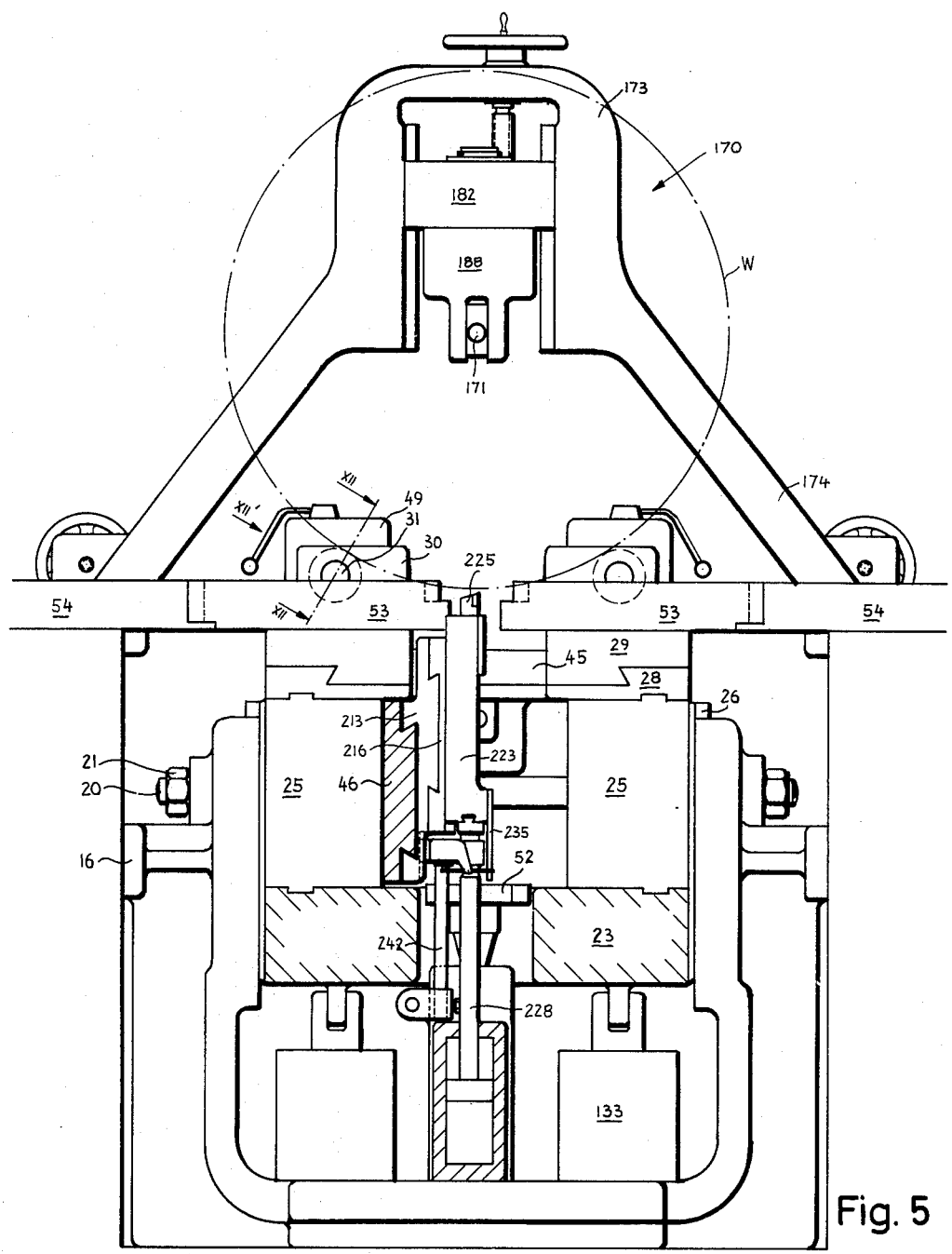
Figure 6A:
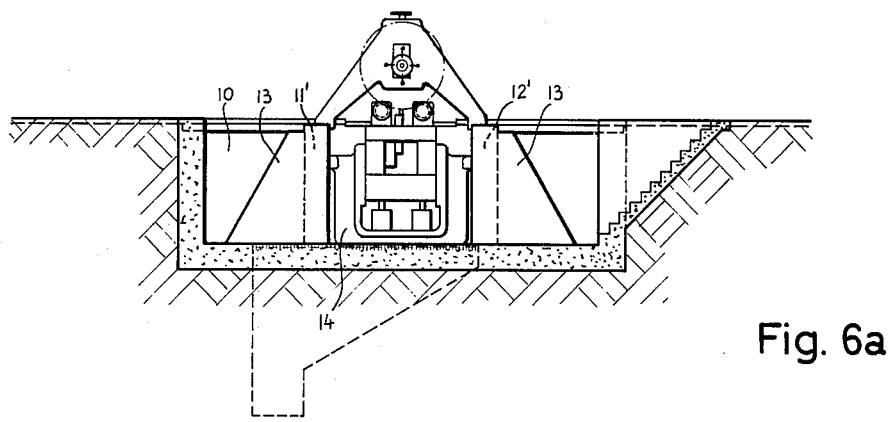
Figure 6:
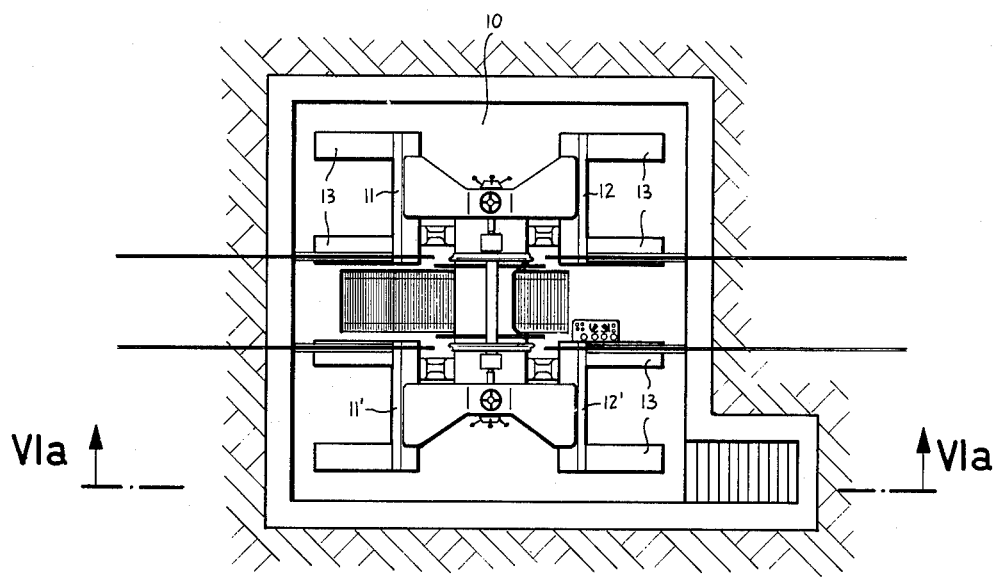
Figure 7:
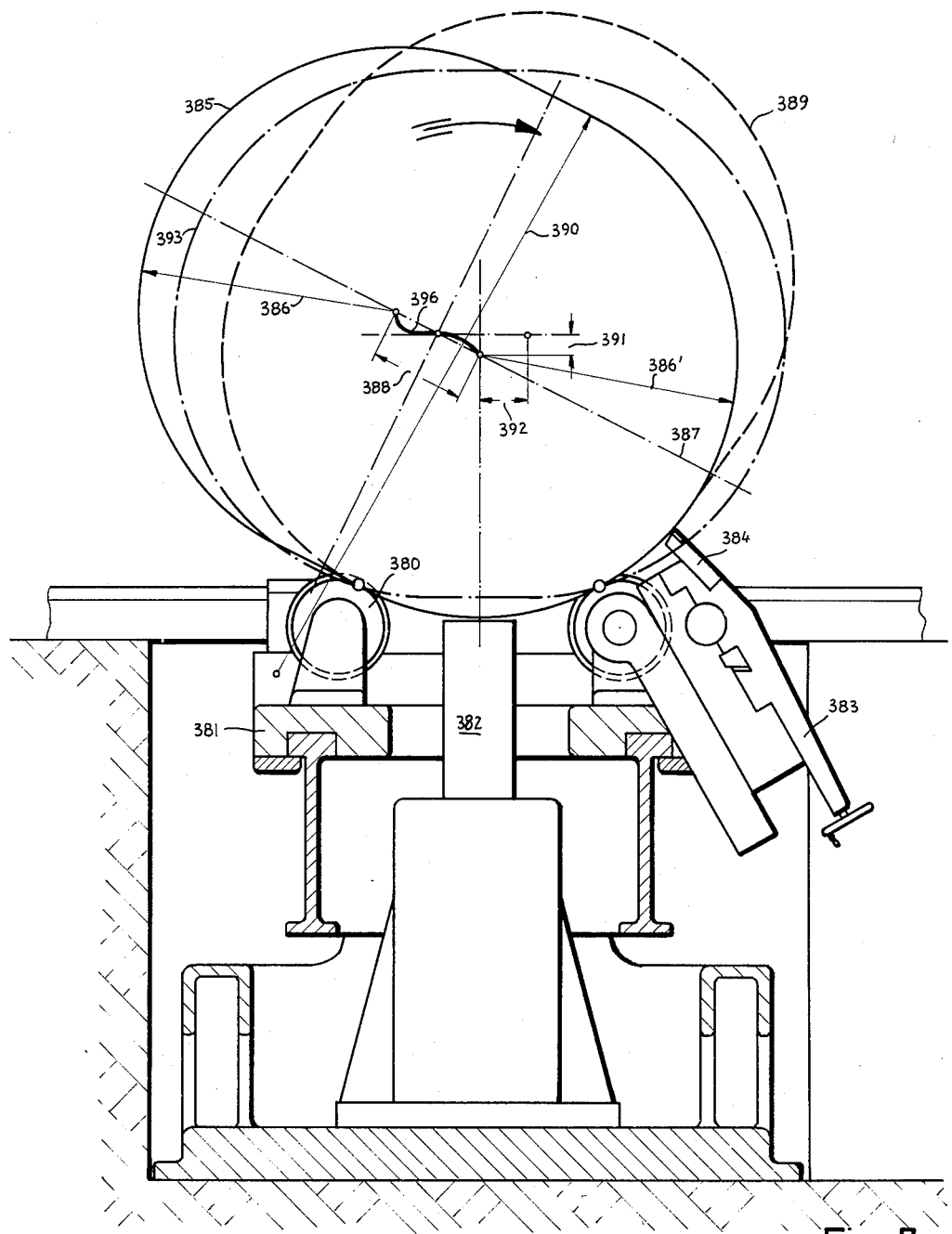
Figure 8:
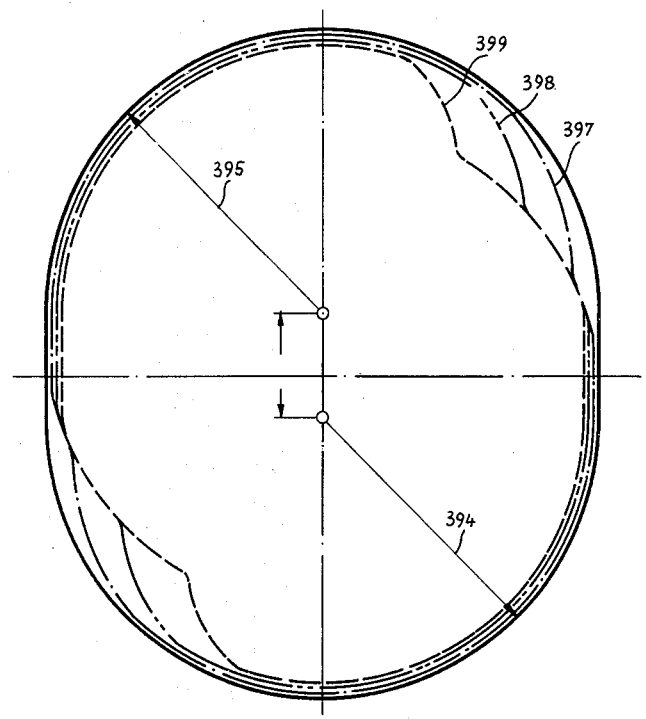
Figure 9:
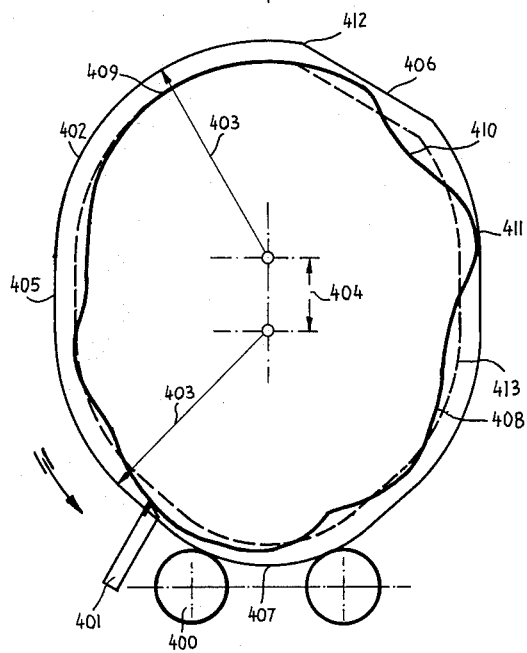
Figure 10:
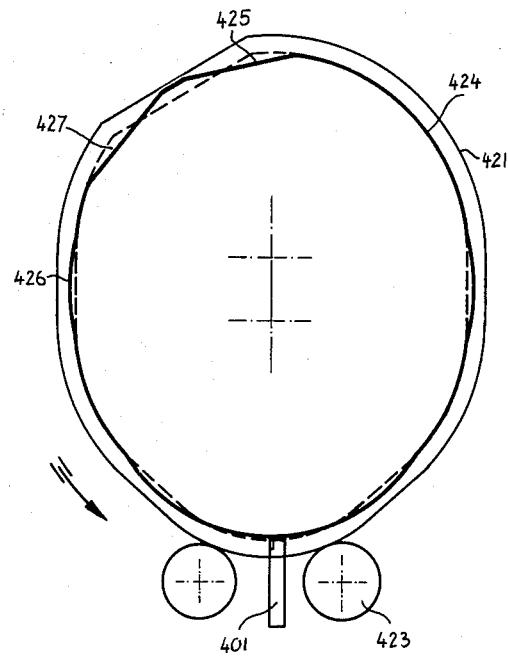
Figure 11:
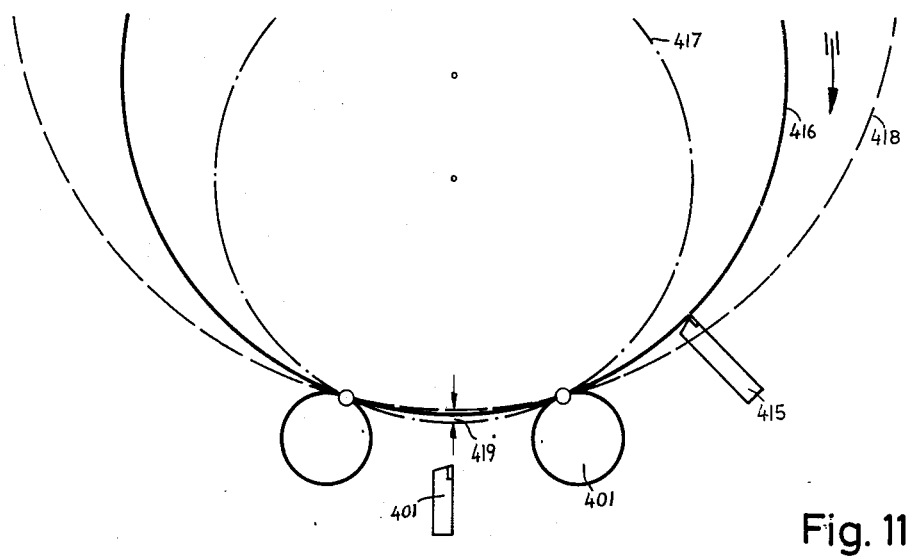
Figure 12:
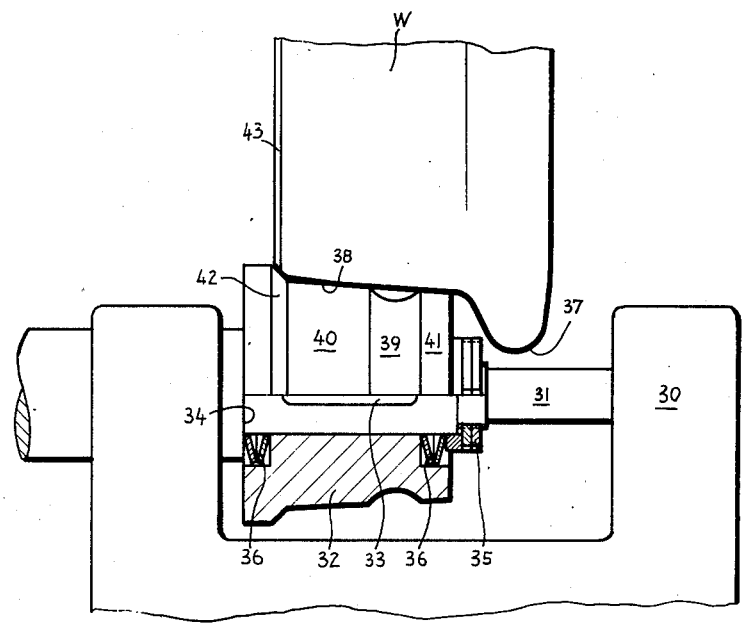
Figure 13:
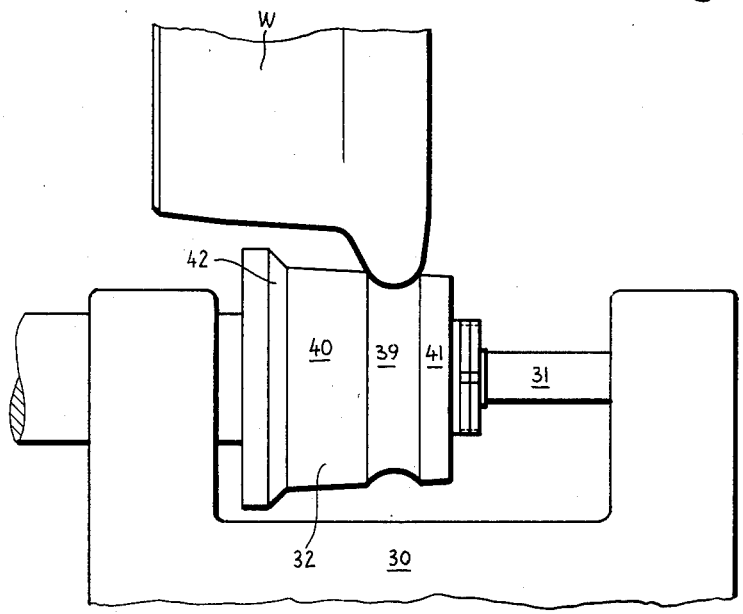
Figure 14:
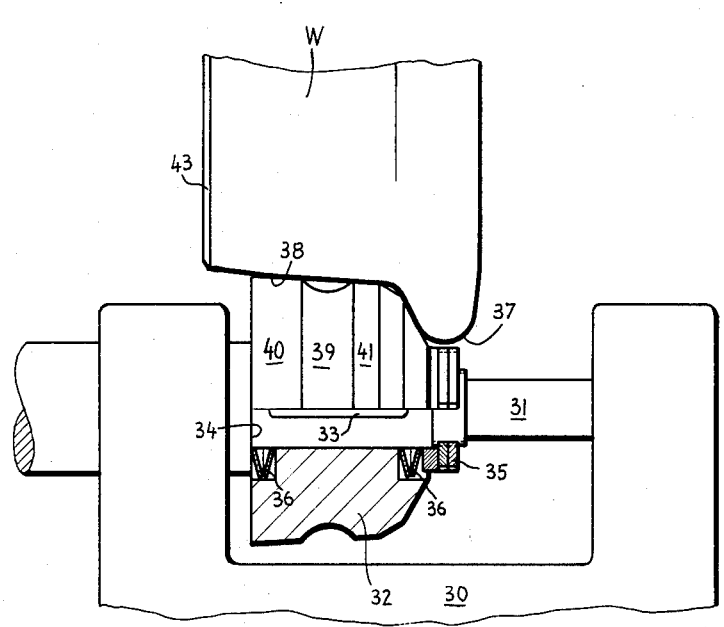
Figure 15:
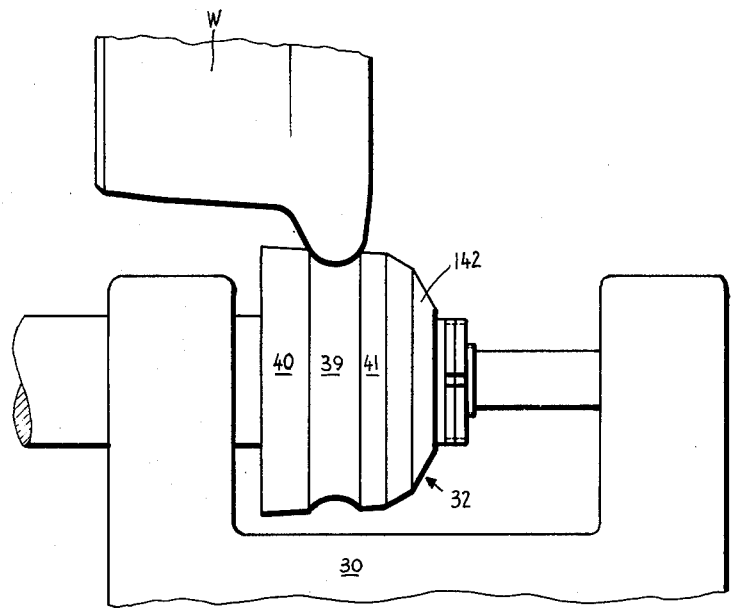
Figure 16:
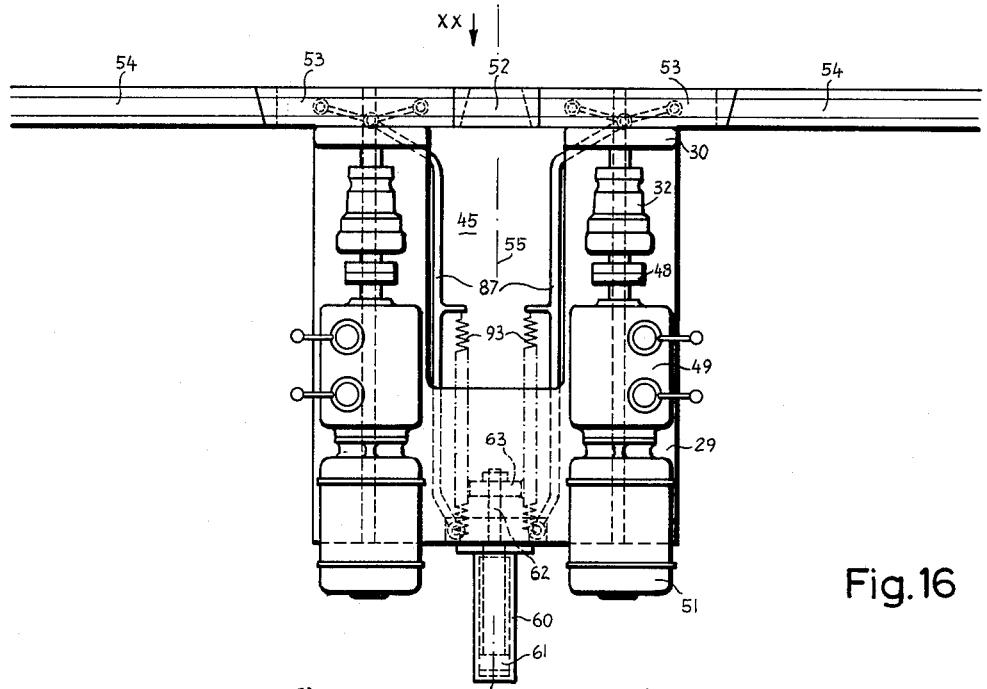
Figure 17:
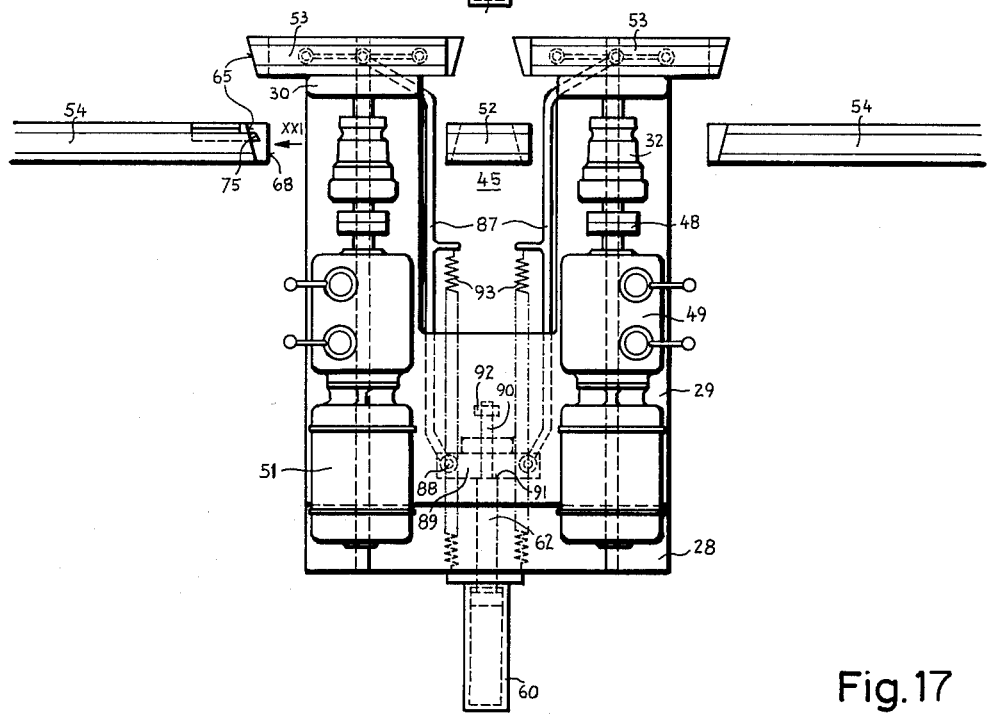
Figure 18:
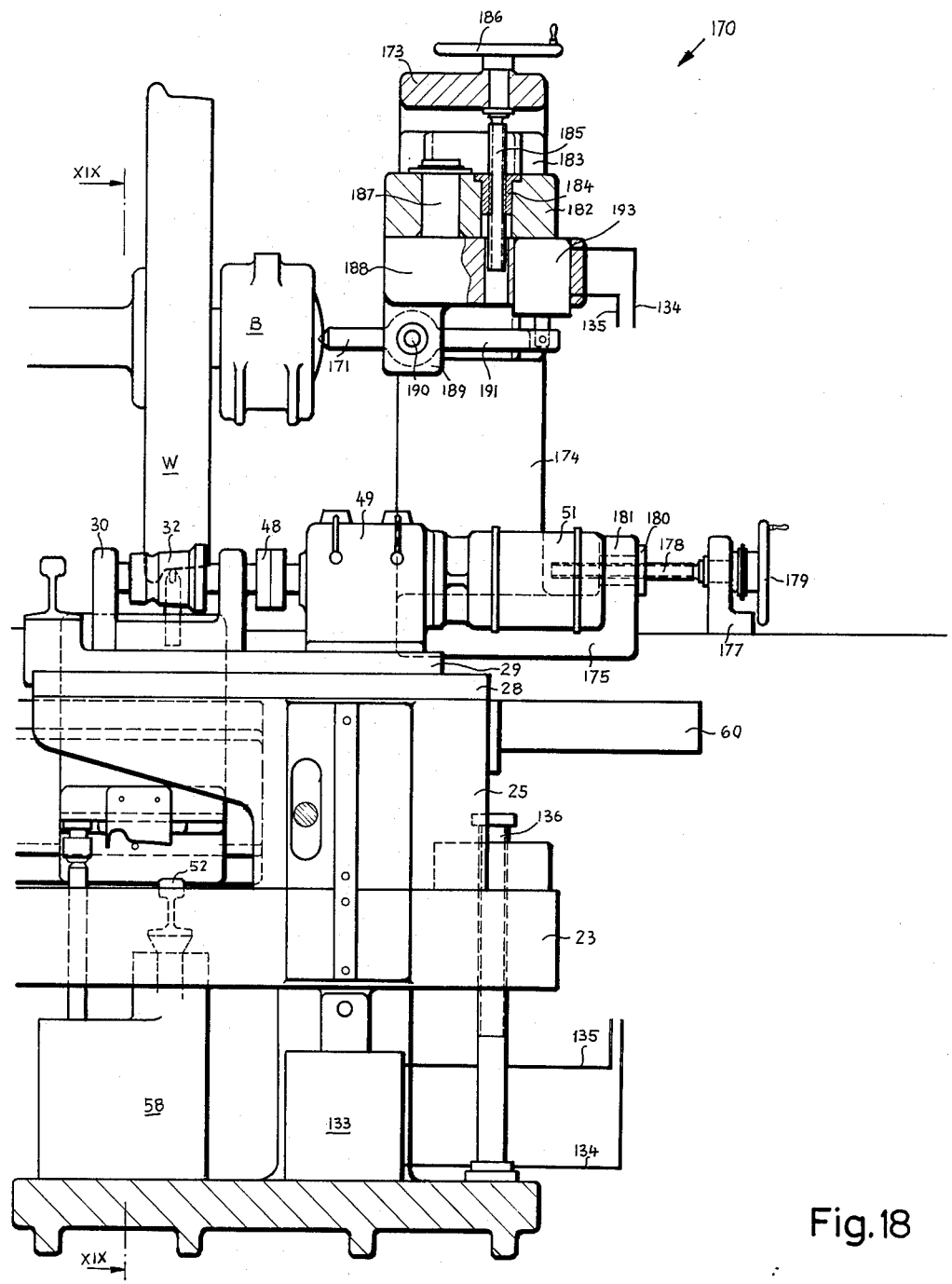
Figure 19:
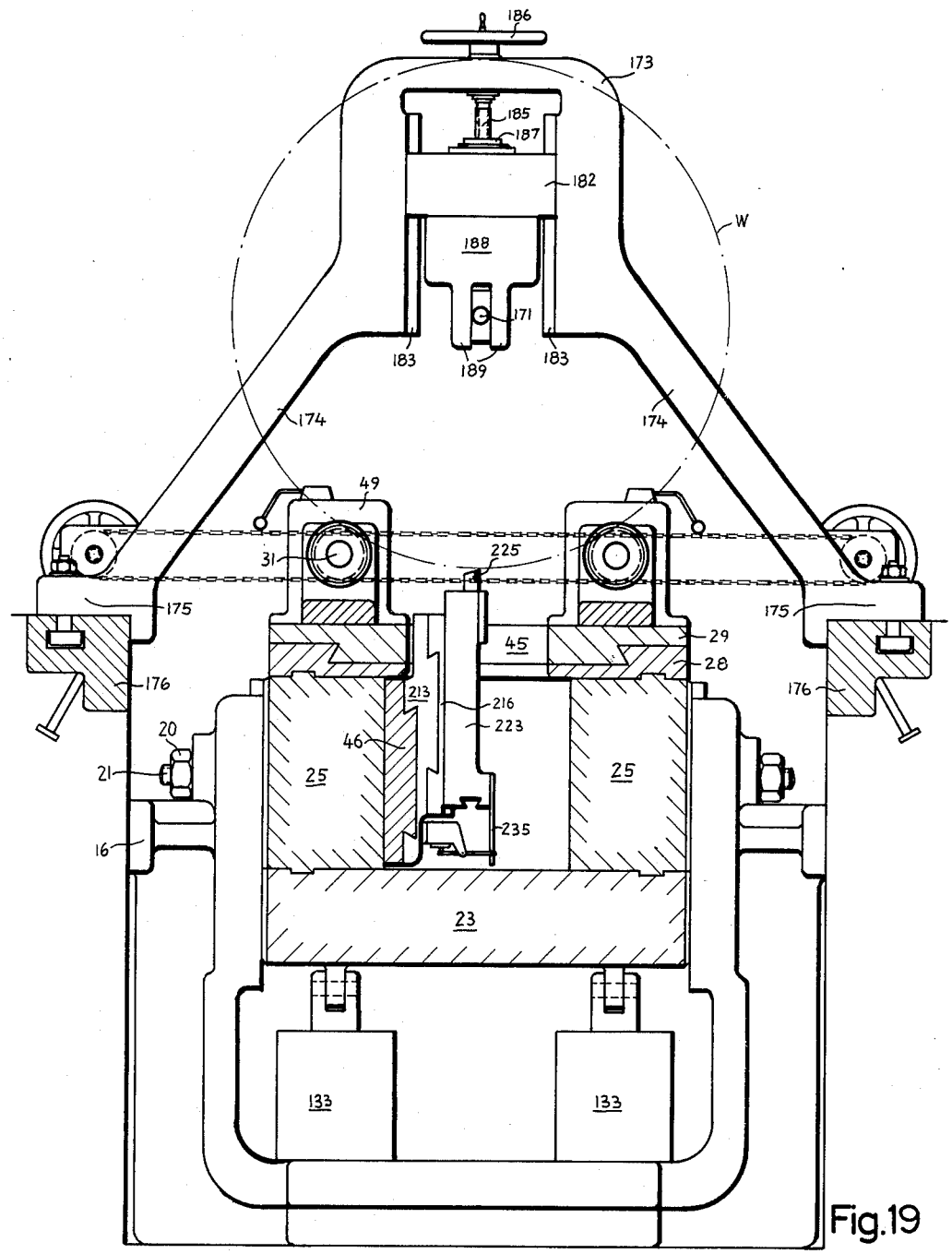
Figure 20:
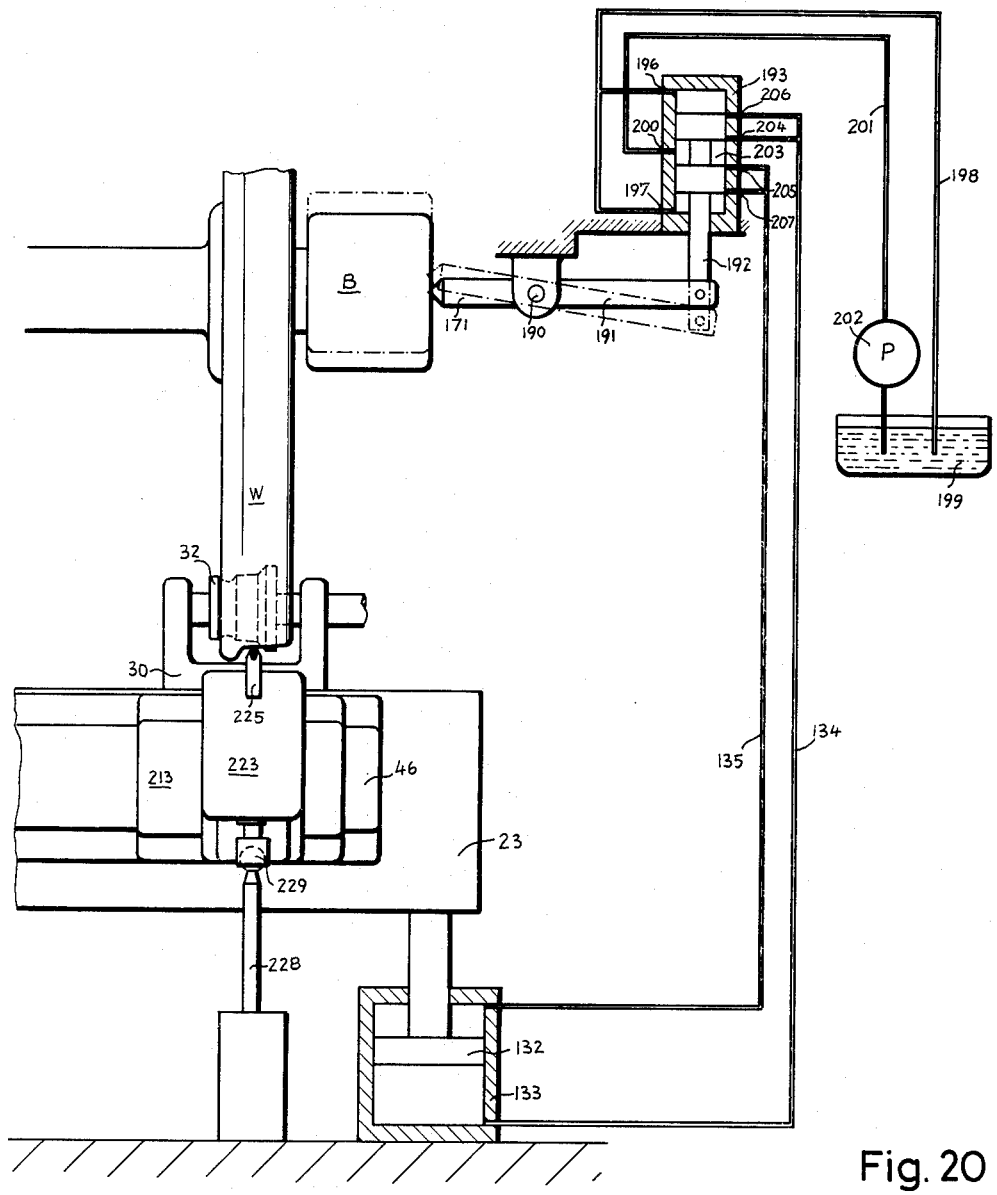
Figure 21:
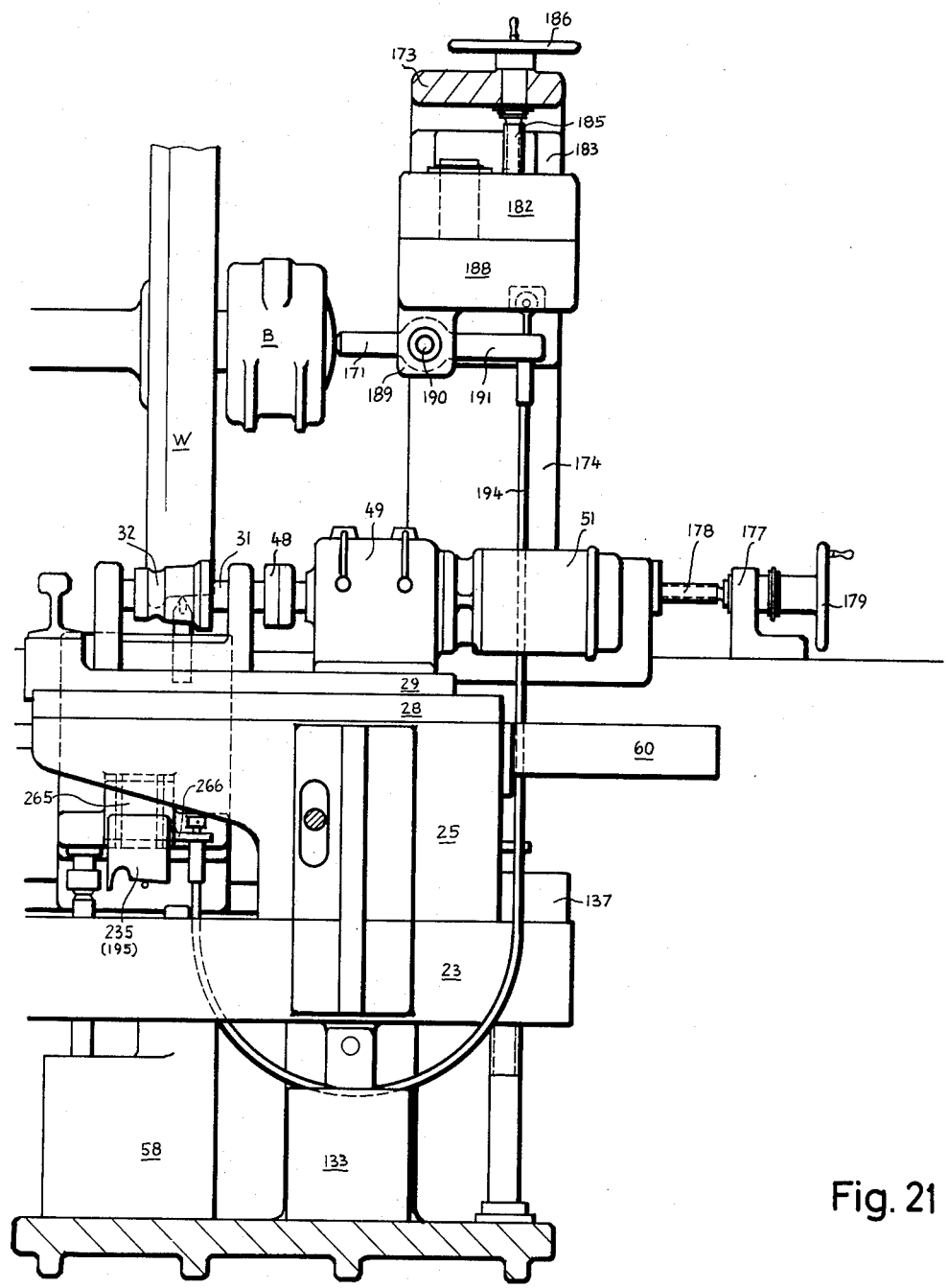
Figures 22, 23:
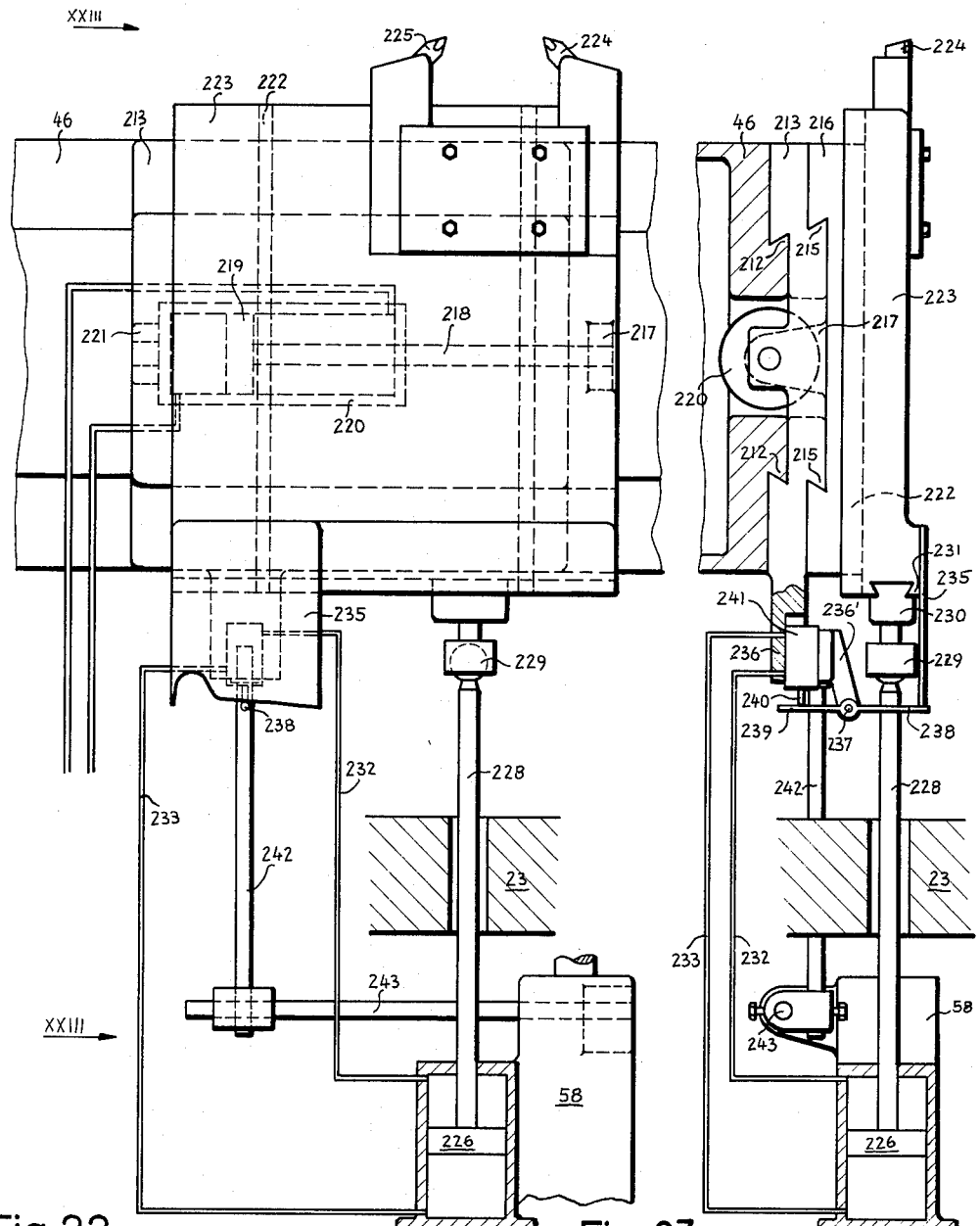
Figure 24:
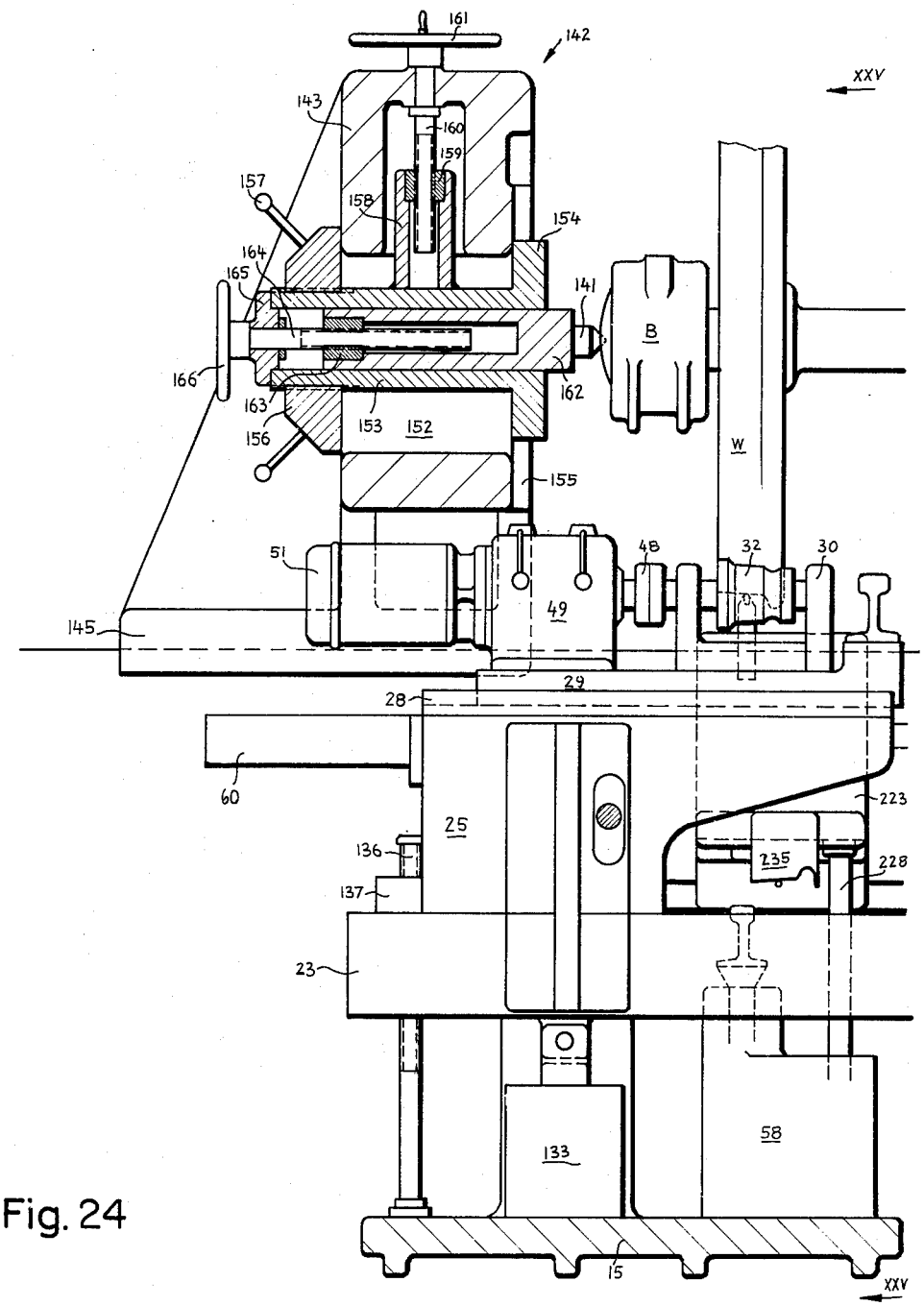
Figure 25:
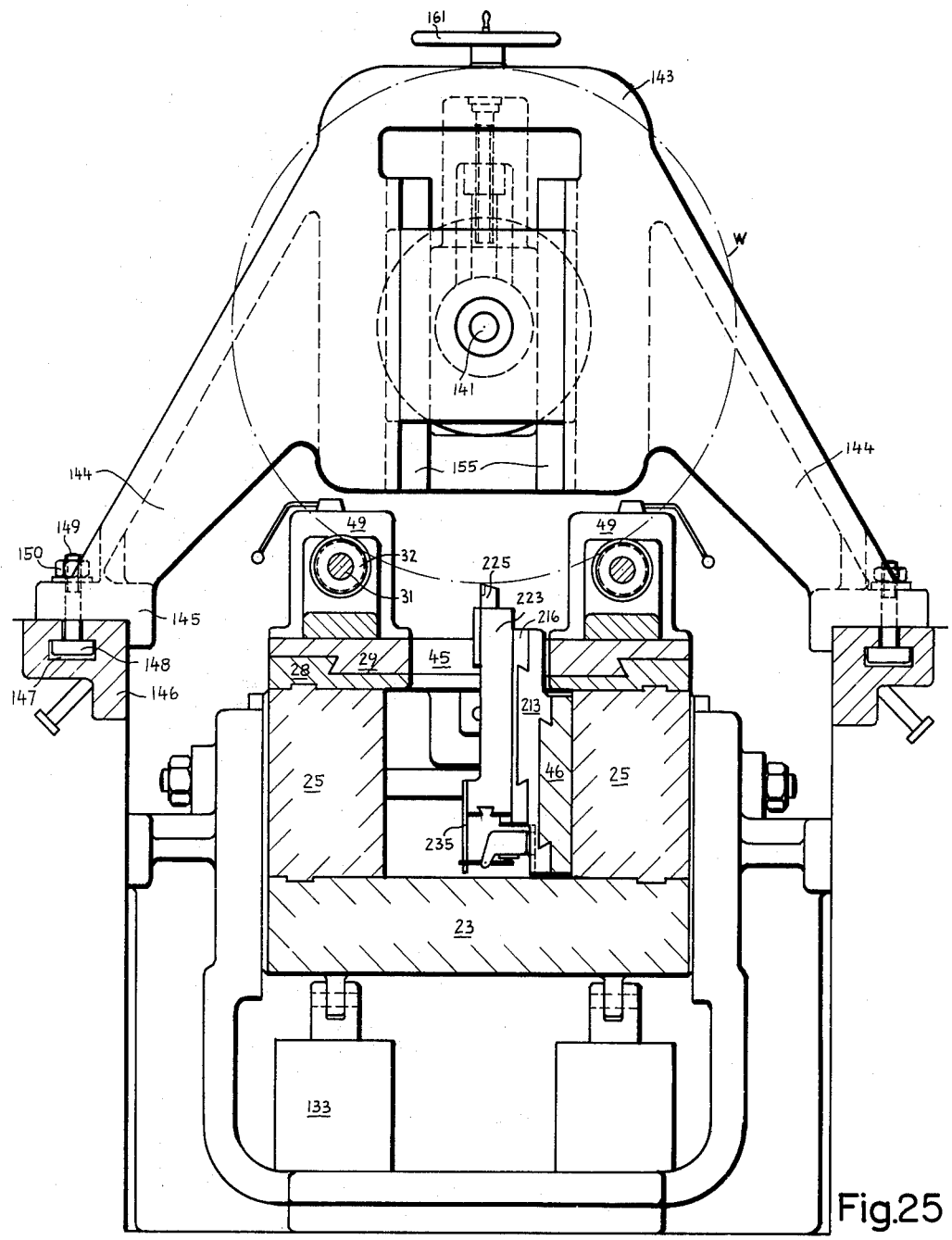
Figure 26:
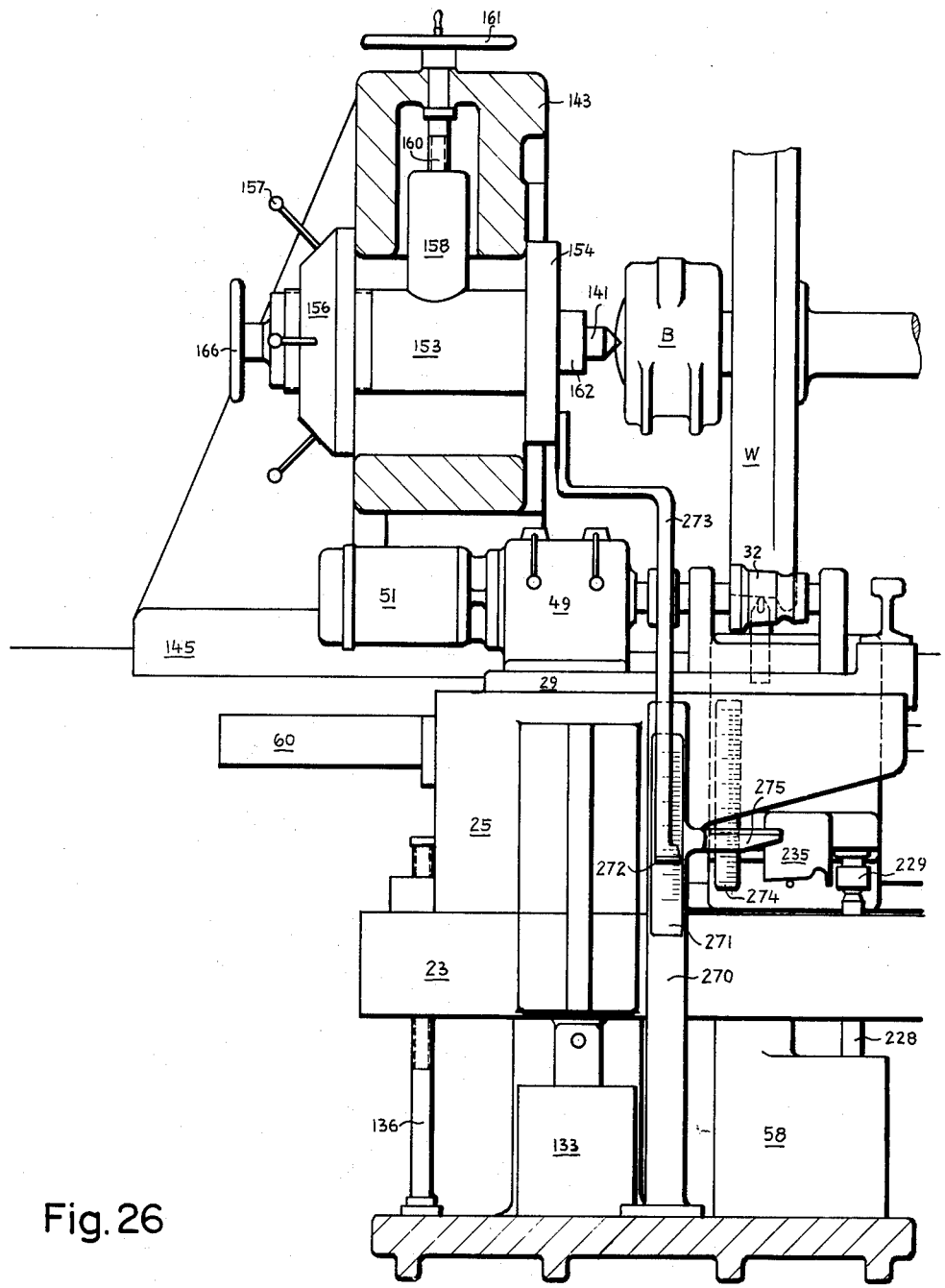

In the drawings:

FIG. 1 is an elevation of my novel underfloor lathe, showing a set of wheels mounted thereon for reconditioning, one of the tailstocks of the lathe being omitted, and the vehicle on which the set of wheels, which is to be re-conditioned is assembled, having also been omitted;

FIG. 1a is a fragmentary side elevation of a modified form of tailstock for the lathe, FIG. 2 is a side view viewed from the left with reference to FIG. 1, FIG. 3 is a plan view of the lathe shown in FIGS. 1 and 2, FIG. 4 is the vertical section taken along the line IV—IV of FIG. 1, FIG. 5 is the vertical section taken along the line V—V of FIG. 1, FIG. 6 is a top view of the pit and of the lathe disposed therein, FIG .6a is a vertical section through the pit taken along the line VIa—VIa of FIG. 6, FIG. 7 is a diagrammatic vertical section through an underfloor lathe of an earlier type known in the art with a laterally disposed tool holder, FIG. 8 illustrates a rotary element machined on the lathe of FIG. 7, FIG. 9 shows another rotary element machined on the lathe of FIG. 7, FIG. 10 shows a rotary element machined with my improved lathe, FIG. 11 is a diagrammatic representation of various tool-positions with respect to a pair of wheel-supporting rollers, FIG. 12 shows a supporting roller viewed in the direction of the arrow XII' of FIG. 5, partly shown in section along the line XII—XII of FIG. 5 with the railway wheel supported on its tread surface, FIG. 13 is a view similar to that of FIG. 12 with the railway wheel supported on its flange surface, FIGS. 14 and 15 are views similar to FIGS. 12 and 13 of a modified supporting roller, FIG. 16 shows a portion of FIG. 3 with the tail stock omitted showing the slide carrying a pair of supporting rollers and their drives and movable rail sections in the position in which all of the rail sections are aligned with each other, FIG. 17 is a view similar to that of FIG. 16 showing the slide in the position in which the rail sections are displaced from aligned position, while the supporting rollers are in wheel-supporting positions, FIG. 18 shows the right-hand portion of FIG. 1 on an enlarged scale, the tail stock being shown partly in section, the tool support in its right-hand operative position and the wheel propping jack in its inoperative lowermost position, FIG. 19 is a vertical section taken along line XIX—XIX of FIG. 18, FIG. 20 is a diagrammatic representation of the jack for lifting and lowering the supporting roller and of the means for controlling the jack by sensing means responsive to an orbiting motion of the wheel axis, FIG. 21 is a side view similar to that of FIG. 18 showing means for operating the tool templet control in response to an orbiting movement of the wheel axis, FIG. 22 is an enlarged portion of FIG. 1 showing the tool support, FIG. 23 shows the section taken along line XXIII—XXIII of FIG. 22, and FIG. 24 is the left-hand portion of FIG. 1 on an enlarged scale with the tail stock being shown in vertical section, FIG. 25 is the vertical section XXV—XXV of FIG. 24, FIG. 26 shows the left-hand portion of FIG. 1 on an enlarged scale with the tail stock being shown in vertical section, and FIG. 27 shows the hydraulic circuit system of the templet-controlled tool feeding mechanism.

A pit 10 disposed below a railway track (FIGS. 2, 6 and 6a) contains two spaced and longitudinally aligned pairs of parallel walls 11, 12 and 11', 12' extending transversely to the track and being reinforced by buttresses 13. As shown in FIGS. 6 and 6a, a stairway leads down into the pit; and the bottom of the pit is formed in its center by a grid through which the chips dropping from the tools may fall down into a ditch provided below the grids.

A pair of upright parallel U-shaped frames 14 and 15 is mounted between the walls 11, 12, 11', 12', the flange portions of these frames being placed on the foundation formed by the concrete floor of the pit, whereas the arms of the frames extend upwardly having outer footportions 16 (FIG. 4) contacting the walls and lower footportions 22 placed on the foundation and parallel inner vertical guiding faces 17 each provided with a vertical groove 18 (FIG. 3) forming a vertical guide-way.

The arms of each U-shaped frame 14, 15 are firmly held in spaced relationship by a horizontal tube 19 (FIG. 2) interposed therebetween through which a bolt 20 extends. The projecting threaded end portions of these bolts are provided with nuts 21. Moreover, the frames 14 and 15 are fixed to the foundation forming the bottom of the pit 10 and to the walls 11, 12, 11', 12' by suitable anchors not shown passing through the footportions 16 and 22.

A substantially horizontal frame structure is slidably mounted on the vertical guide-ways 17, 18, such structure comprising a pair of spaced horizontal beams 23, FIGS. 1, 4 and 5, horizontal transverse beams 24 integral therewith, and four standards 25 placed on and firmly bolted to the frame formed by the beams 23 and 24 near the corners thereof. On its opposite sides this structure has vertical ribs 26 which project into and are slidably guided in the grooves 18 (FIG. 3) with so much clearance that the frame structure 23, 24, 25 can assume a slightly slanting position when viewed in FIG. 1.

Moreover, the frame structure 23, 24, 25 is further reinforced by a vertical longitudinally extending plate 46, FIGS. 1, 3 and 5, which is firmly connected to the vertical inner faces of the standards 25 located at the left with reference to FIG. 5.

One of the two beams 23 is recessed on its side face confronting the walls 11 and 11' to facilitate the operator's access to the tool, as shown in FIG. 3 at 47.

Each standard 25 has a lateral projection at its top extending towards the other standard 25 when viewed as in FIG. 1 so as to form an extended horizontal top surface 27, FIG. 2. Each pair of standards 25 as viewed in FIG. 2 carries a suitable plate 28 rigidly fixed to the standards and provided with a dove-tail guide-way which extends horizontally parallel to the walls 11, 12, 11', 12'. As there are two pairs of standards each pair carrying a plate 28, there are two guide-ways provided in alignment with each other.

Each guide-way slidingly accommodates a slide 29, FIGS. 16 and 17. Each slide 29 carries pair of brackets 30 (FIG. 5) providing for two pairs of coaxially aligned bearings, the axes of said pairs extending horizontally and parallel to the walls 11, 12, 11', 12' at substantially the same level. In each pair of bearings a shaft 31, FIGS. 1, 4, 5 and 12–15 is journaled and held against axial displacement, a supporting roller 32 being slidably mounted and secured for common rotation on this shaft by a suitable key (FIGS. 12 and 14).

Preferably, each shaft 31 between its bearings is provided with a shoulder 34 and with one or more split rings 35 engaging a groove of the shaft 31 so as to be held against axial displacement thereon. Dished annular spring plates 36 are inserted between each side wall of the supporting roller 32 and the opposed shoulder 34 or split ring 35, respectively, so as to hold the supporting roller 32 resiliently in centered position while permitting a limited axial displacement thereof.

Each of the supporting rollers 32 has adjacent different peripheral zones for alternative supporting engagement either by the flange surface 37 of the flanged wheel W to be reconditioned or by the tread surface 38 thereof. Preferably, the peripheral zone for the supporting engagement by the flange surface 37 is the surface of a narrow shallow peripheral groove 39 provided within a relatively wide surfaces 40, 41 which constitutes the other one of the peripheral zones for the supporting engagement by the tread surface 38 of the wheel W.

The roller 32 has a conical surface 42 adjacent to the relatively wide peripheral surface 40, 41. While in the embodiment illustrated in FIGS. 12 and 13 this conical surface 42 forms a shoulder for engagement with the outer edge 43 of the wheel W, I have shown another embodiment of the roller in FIGS. 14 and 15 in which the conical surface 142 is provided on the other end of the supporting roller 132 for engagement with the inner conical face of the flange of the wheel W as shown in FIG. 14. In either case it is the purpose of the conical surfaces 42 or 142 to center the set of wheels to be re-conditioned in their axial direction.

Preferably, the opposed edges of each of the plates 28 and slides 29 guided thereon are recessed as shown at 45 in FIGS. 5 and 17. The purpose of this recess will be described hereinafter.

During the re-conditioning operation the pair of rollers 32 on one of the slides 29 supports one wheel W of the set, whereas the pair of supporting rollers 32 mounted on the other slide 29 simultaneously supports the other wheel W of the set.

Each of the four shafts 31 is connected by a clutch (FIG. 1) to a suitable drive which, in the embodiment shown, consists of a speed change transmission 49 having two speeds and a speed change lever 50, movable to one or the other of the two speed positions, and of an electric motor 51 flanged to the housing of the transmission 49. The electric motor is preferably an asynchronous motor of the type having a squirrel cage armature and a plurality of stator windings which can be so optionally connected as to result in one or the other of two speeds. A motor of this type will readily adapt itself to small fluctuations of the speed without any substantial electrical losses. Such fluctuations are liable to occur owing to differences of the diameters of the wheels W of the set caused by wear or by inaccuracies in the manufacture.

Preferably, the transmission 49 is fixed to the slide 29, each slide carrying two such transmissions, each provided with its own electric motor 51.

Each of the rails of the track passing across the pit 10 is composed of a central section 52 (FIG. 4), two adjacent auxiliary sections 53 and fixed stationary end sections 54. When these sections are aligned with each other, as shown in FIG. 16, the railway vehicle may roll on the track into the position in which the axis of the sets of wheels W to be re-conditioned is disposed within the vertical central longitudinal plane of the lathe indicated in FIG. 16 by the dash-dotted line 55. The central rail section 52 intersected by this plane is carried by a suitable jack, preferably in form a hydraulic ram 56 (FIG. 4) movable in a vertical cylinder bore 57 of a cylinder block 58 and having a stem 59. As there are two rails, two such jacks are provided, each cylinder block 58 being mounted on the bottom section of one of the frames 14, 15. After the vehicle has been moved into the proper position above the pit, the central rail section 52 is lifted, whereupon each slide 29 is moved from the FIG. 16-position to the FIG. 17-position, thereby straddling the stem 59 of the ram 56 and the central rail section 52 with the wheel W thereon within the recess 45, as shown in FIG. 17.

The auxiliary rail sections 53 are fixed to the inner ends of the slides 29 thus moving into the position shown in FIG. 17 in which they are no longer in registry with the rail sections 52 and 54. The supporting rollers 32, however, are now positioned the wheels W. When the movement of the slides 29 from the FIG. 16-position to the FIG. 17-position has been completed, the wheel jacks 56–59 are lowered into the position shown at the left in FIG. 1 moving the central rail section 52 to a lower level than that of the lower edge of plate 46 out of the way of the tool supports (to be described later). In the course of the downward movement of the wheel jacks the wheels W of the set to be re-conditioned are placed on the supporting rollers as indicated at the left in FIG. 1.

The actuating means for moving each slide 29 comprises a horizontal cylinder 60, FIGS. 1, 16 and 17 mounted within the plane 55 and suitably fixed to the bottom of plate 28, FIG. 2. A piston 61 movable in cylinder 60 has a piston rod 62 extending in inward direction out of the cylinder into the space between the adjacent standards 25 and has a lost-motion-connection with a downwardly extending projection 63 of the slide 29. The purpose of this lost-motion-connection will be described later.

The rail sections 53 and 54 are separated from each other by a first cut 65 (FIG. 17) extending vertically, but with a sidewise slant, through the head portion 66, FIG. 1, and the web portion 67 of the rail, by a second cut 68 extending vertically and transversely through the foot portion 69 of the rail and by a third horizontal cut 70 connecting these cuts. Similarly, each auxiliary rail section 53 is separated from the central rail section 52 by three adjoining cuts, the first cut extending vertically and transversely through the head portions of the rail, the second cut extending vertically but with a sidewise slant through the web section and the foot section of the rail and the third cut joining the first cut with the second cut extending horizontally.

As a result, the auxiliary rail sections 53 are supported by the fixed rail sections 54 and in their turn support the central rail section 52, when the rail sections are aligned with each other as shown in FIG. 16. This is desirable in order to enable the track to carry heavy vehicles riding across the pit irrespective of the condition of the jacks 56, 57, 59 which may or may not support the central rail sections 52.

When the slides 29 have been moved into the FIG. 17-position, the jacks 56, 57 are lowered again thus placing the wheels W upon the two pairs of rollers 32 which, however, are disposed at such a level as to keep the set of wheels above its normal level to thereby ensure increased engaging pressure between the wheels W and the rollers 32, as desirable to ensure sufficient driving friction.

When the machining operation has been completed and the tool supports to be described hereinafter have been withdrawn, the jacks 56, 57 are actuated again to raise the set of wheels out of engagement with the rollers 32, whereupon each piston 61 is moved back to the FIG. 16-positon. In the initial stage of this movement the slide 29 will remain at rest while the lost-motion between the nut 92 and the projection 63 of the slide is being taken up. During this initial stage of the movement, however, the springs 93 will maintain the cross head 89 in engagement with shoulder 91 of the receding piston rod 92 thereby collapsing the toggles 82, 83 and withdrawing the bars 80 which permit each block 75, at the end of the subsequent return movement of slide 29, to spring back into locking engagement without interference with the bars 80 now held withdrawn by the collapsed toggles.

The roller holder comprised of the frame structure 23, 24 25, 46 and of the pair of slides 29 for holding the rollers 32 either may be held in a floating condition permitting up and down movement to the rollers 32 as required to maintain their frictional engagement with the set of non-circular or eccentric wheels, when the axis of this set is held on a stationary level, or, alternatively the roller holder may be firmly clamped in fixed position during the cutting operation, provided that the axis of the set of wheels is free to move up and down as long as the peripheries of the wheels to be reconditioned have a non-circular or eccentric shape owing to wear or deformation of the wheel axle.

For this purpose each of the beams 23 has two depending lugs 130, 130' near its ends, FIG. 1 and 4, each straddled by and pivoted to the upper bi-furcated end of a vertical piston rod 131 or 131' of a piston 132, or 132' respectively, movable in a vertical cylinder 133, or 133' respectively, mounted on the frame 14, or 15 respectively, and suitably fixed thereto.

The lower chambers or the two cylinders 133 below the pistons 132 communicate with a common pipe 134 (FIGS. 18 and 20), whereas the cylinder chambers above the pistons 132 communicate with a common pipe 135. Similar pipes are co-ordinated to the pair of cylinders 133'. Since both pairs of the cylinders are controlled by similar mechanism, it will suffice to describe one of these mechanisms hereinafter which is co-ordinated to the pair of cylinders 133.

The transverse beam 24 carries vertical threaded spindles 136 and 136' (FIGS. 1 and 2) near each lug 130 which extends downwardly and upwardly and is vertically adjustable by a fluid motor diagrammatically indicated at 137, FIG. 1 and 2, while the lower end of the threaded spindle 136 is braced against the bottom portion of frame 15. The threaded spindle may be guided in a vertical bore of the transverse beam 24 by a key for axial displacement, whereas a nut engaging the threads of the spindle is fixed to the rotor of fluid motor 137 and thus held against axial displacement. Alternatively, the nut may be fixed to the transverse beam 24. In that event, the spindle is rotatable by the fluid motor 137 and guided therein for axial displacement.

When it is desired to clamp the roller holder firmly in stationary condition at a predetermined adjustable level, the fluid motors 137 are operated for the adjustment of such level and, when such adjustment has been completed, pipe 135 is connected to a source of fluid whereas pipe 134 is connected to exhaust. The pressure acting on the top faces of pistons 132 will firmly clamp the roller holder in its desired position to the frame 15. The same description applies to the pair of pistons 132' and spindles 136' co-operating with frame 14.

Where it is desired to maintain the roller holder in floating condition in which frictional engagement is ensured between the rollers 32 and the set of wheels to be re-conditioned, the pipes 135 are connected to exhaust whereas the pipes 134 are connected to a source of pressure. For the purpose of stabilizing this pressure, the pressure accumulator 140 of a well known type containing a nitrogen-filled flexible bag communicates with the pipe 134. The pressure acting upon the bottom faces of the pair of pistons 132 is so chosen as to ensure proper engaging pressure between the pair of rollers 32 and the wheel W placed thereon and held between stationary centers 141 of tail stock 142 which will now be described in detail with reference to FIG. 1, 2 and 24.

A pair of such tail stocks 142 is provided for the engagement with the ends of the wheel axle or with bearing housings B thereon although in FIG. 1 just one of the two tail stocks 142 is shown. Its housing 143 is formed with legs 144 mounted above floor level so as to bridge the pit 10, the foot 145 of each leg being slidably guided on an angle bar 146 which is diagrammatically indicated in FIG. 2 and shown in detail in FIG. 26. This angle bar has a T-slot 147 slidably engaged by the head 148 of an anchoring bolt 149 bearing a clamping nut 150 engaging the foot 145 through which the bolt 149 extends. Suitable means such as threaded spindles 151 (FIG. 1) described later with reference to tail stocks of a different type may be provided for horizontal adjustment of the tail stock 142 along the angle bars 146.

The housing 143 has an aperture 152, FIG. 24 through which a horizontal bushing 153 extends which is guided within the opening 152 for up and down movement. For this purpose the end of the bushing 153 adjacent to the bearing housing B is formed with a rectangular flange 154 slidably guided between a pair of opposed vertical shoulders 155 formed on the end wall of housing 143. The other end of the bushing 153 is threaded and carries a clamping nut 156 provided with handles 157 for manual actuation. For the purpose of raising and lowering the bushing 153 it is welded to an upright sleeve 158 in which a nut 159 is fixed. A threaded spindle 160 journaled in the casing 143 and bearing a hand wheel 161 for manual operation engages the nut 159. The center 141 is carried by a tubular member 162 bearing a nut 163 fixed thereto and engaged by a horizontal threaded spindle 164 journaled in a collar plate 165 and bearing a hand wheel 166 for actuation. The collar plate 165 is suitably fixed to the bushing 153. After the bushing 153 has been adjusted to the proper level by actuation of the end wheel 161, the nut 156 is tightened to clamp the bushing 153 in position. Thereupon the center 141 may be moved forwardly into engagement with the set of wheels by actuation of the hand wheel 166.

For the purpose of increasing the accuracy of the centerless method of reconditioning the set of wheels W, I have provided a novel kind of tail stocks 170 which may be substituted for the tail stocks 142. While one such tail stock 170 is shown in FIG. 1 it will be understood that in practical operation both of the tail stocks co-operating with the set of wheels must be of the same type, so that two of these tailstocks would be required. They would be mounted on the angle bars 146 (FIG. 2), one for each axle bearing housing B.

Each of the two tail stocks 170 has a sensing pin 171 which is operative in lieu of a regular stationary center pin, such as 141, to engage the axle bearing housing B. This sensing pin serves the purpose of sensing and detecting the level of the axis of the set of wheels W without, however, exerting any substantial pressure upon the bearing housings W. Suitable hydraulic means described herein later are controlled by the sensing pins 171 and serve the purpose of eliminating any influence which otherwise orbiting motions of the bearing housings B caused by a non-circular or eccentric shape of the wheel peripheries carried by the supporting rollers 32 might have on the distance between the axis of the set of wheels and the reconditioning tools. For this purpose, the hydraulic means just referred to is operative to lower and lift either the roller holder or the tool holder in synchronism with the orbiting movement of the housings B.

The tail stock 170 will now be described in detail with reference to FIGS. 18 to 21. A housing 173 has a pair of legs 174 provided with feet 175 guided on stationary horizontal angle bars 176 which are similar to the angle bars 146 and, therefore need not be described in detail. For the purpose of longitudinal displacement of each foot 175 on the angle bars 176, a bracket 177 is fixed to each angle bar and carries a bearing for a threaded spindle 178 provided with a hand wheel 179. The threaded spindle 178 engages a nut 180 fixed to an upright flange 181 of the foot portion 175.

A block 182 is slidably guided in a vertical guideway 183 provided by the housing 173 and carries a nut 184 fixed thereto and engaged by a threaded spindle 185 which is rotatably but non-shiftably mounted in the housing 173 and carries a hand wheel 186 for manual actuation, whereby the block 182 may be lifted or lowered. The block 182 has a vertical bore pivotally accommodating a pin 187 projecting upwardly from a bracket 188 having a pair of depending projections 189 through which a horizontal pivot pin 190 extends at right angles to the central longitudinal plane 55 of the laths. The sensing pin 171 forms one arm of a two-armed lever which is pivotally mounted on the pin 190. The other arm 191 may have various functions. For this purpose it may be either connected to a control plunger 192 of a cylindrical slide valve 193 controlling communication of the pipes 134 and 135 with the source of pressure liquid or exhaust or, alternatively, the lever arm 191 may be connected by a Bowden-cable 194, FIG. 21, to a tool-controlling templet 195 so as to displace the same upwardly or downwardly in synchronism with the orbiting movement of the axle housing B, whereby the tool is lifted and lowered accordingly, as will be described later in connection with an explanation of the tool support and to the templet-controlled mechanism.

The valve housing 193 fixed to the bracket 188 has two outlet ports 196 and 197 which communicate with an exhaust pipe 198 leading to an oil reservoir 199. Between the outlet ports 196, 197 the valve housing 193 is provided with an inlet port 200 communicating by a pipe 201 with a source of pressure liquid represented as a pump 202 whose outlet communicates with pipe 201 while its inlet communicates with the reservoir 199.

The inlet port 200 is in permanent communication with a peripheral groove 203 of the control plunger 192 and may alternately communicate with a port 204 or a port 205 of housing 193. The upper end chamber of the valve housing 193 is in permanent communication with the exhaust port 196 and will be connected with the pipe 134 whenever a port 206 connected therewith will be uncovered by the control plunger. The lower end chamber of the valve housing 193 is in permanent communication with the exhaust port 197 and will be also connected with the pipe 135 whenever a port 207 connected therewith will be uncovered by the control plunger.

The ducts connected to the valve housing 193 are so flexible that they will not interfere with the upward or downward adjustment of the block 182 and with pivotal movement of the bracket 188 about the axis of vertical pin 187.

The operation of the hydraulic control means is as follows:

The horizontal components of any orbiting movement of the bearing housing B will oscillate the bracket 188 about the axis of pin 187 and thus will have no influence on the control valve 192, 193. Any vertical components of the orbiting movement of the axle housing B, however, will pivot the sensing pin 171 about the pin 190 and will thus displace the control plunger 192 in the valve housing 193. Upward movement of axle housing B and the consequent downward movement of the plunger 192 establishes communication of the source of pressure 202 with the pipe 135 via the ports 200 and 205 and communication of the exhaust duct 198 with the pipe 134 via the ports 196 and 206. Therefore, any tendency of bearing housing B to move upwardly will be immediately counteracted and compensated by a corresponding downward movement of the pair of pistons 132 and the end portion of the roller holder connected therewith. A similar effect occurs upon any downward movement of axle housing B resulting in the establishment of communication of the pressure pipe 201 with duct 134 and of the exhaust pipe 198 with duct 135, whereby the pair of pistons 132 will be moved upwardly so as to counteract and compensate any downward movement of axle housing B.

At the same time the other pair of cylinders 133' will be controlled in a similar fashion by the sensing pin of the other tail stock 170 engaging the other axle bearing B shown at the left of FIG. 1. In this manner, the axis of the set of wheels W will be maintained at a constant level with great accuracy.

While I have termed my novel machine a lathe, it is to be understood that the tools for reconditioning the wheels W may be any suitable tools including grinding wheels or milling tools although I prefer to use ordinary cutting tools, as ordinarily employed in lathes.

A pair of tool supports is provided each co-ordinated to one of the wheels W. These tool supports shown in FIG. 1 at 210 and 211 are mounted on the roller holder. As both tool supports are similar in design, it will suffice to describe tool holder 210 hereinafter with reference to FIGS. 1, 2, 5, 21, 22, 23 and 27.

The plate 46 forming part of the roller holder is provided with a horizontal guideway 212 of dove-tail cross section on which a bed slide 213 is guided. This side is adjustable in longitudinal direction by a horizontal threaded spindle 213', FIG. 1, which is held against axial displacement in bearings fixed to the plate 46 and threadingly engages a nut fixed to the bed slide 213. The spindle 213' may be rotated manually by a suitable hand wheel (not shown). The spindle 213' co-ordinated to the other tool support 211 is co-axially disposed with respect to the tool spindle 213' and is rotatable independently thereof for the purpose of permitting independent longitudinal adjustment of the pair of tool supports 210 and 211. The bed side 213 has a horizontal guideway of dove-tail cross section which extends parallel to the guideway 212 and is indicated in FIG. 23 at 215. A second slide 216 is slidably guided on the guideway 215 and has a rearwardly (with reference to FIG. 1) extending lug 217 to which a horizontal piston rod 218 is fixed (FIG. 22). A piston 219 fixed thereto is movable in a cylinder 220 which is located in a longitudinal slot of plate 46 and is fixed to a lug 221 of bed slide 213. Therefore selective communication of the end chambers of cylinder 220 with a source of pressure liquid or with exhaust will produce a longitudinal feed movement of the second slide 216 with respect to the bed slide 213.

The second slide 216 is provided with a vertical guideway 222 of dove-tail cross section, FIG. 23 on which the tool holder 223 is movably guided. In the embodiment shown in FIG. 22 the tool is comprised of a pair of cutting blades 224 and 225 mounted in easily adjustable manner and spaced a distance exceeding the width of the wheel W, tool 224 being used to machine surfaces of the wheel W facing towards the right in FIG. 1, while the other blade 225 is used to machine surfaces facing in the opposite direction.

When the roller holder is held in floating condition by the pairs of pistons 132, 132', while the axis of the set of wheels W is stabilized either by fixed centers 141 or under control by the sensing pins 171, the floating up and down movements of the roller holder accompanied by corresponding up and down movements of the piston 132 and 132' and the tool supports must not affect the vertical feed movements of the tools. Therefore, I have provided adjustable means for keeping each tool holder 223 at a fixed but adjustable level, the adjustment of such level representing the vertical feed movement imparted to the tool. This adjustable means is formed by a jack, preferably a hydraulic jack having a piston 226 carrying the tool holder 223 for vertical movement. The piston 226 is movable in a vertical cylindrical bore 227 of the cylinder block 58, FIGS. 1 and 22, and its piston rod 228 is connected by a ball joint 229 with a head 230 (FIG. 23) which is slidably guided in a horizontal dove-tail guideway 231 provided in the bottom edge face of tool carrier 223. Hence, vertical feed movement may be imparted to the tool by suitable control of ducts 232 and 233 communicating with the end chambers of the cylinder bore 227, FIG. 23.

When the set of wheels W is held between the fixed centers 141 of the tail stocks 142, the connection of ducts 232 and 233 with a source of pressure liquid and with exhaust may be manually controlled by suitable valves not shown. In this operation the roller holder with the rollers 32 rotatably mounted thereon will be held in contact with the peripheries of the wheels W and will perform up and down movements, when such peripheries have a non-circular or eccentric shape. While the bed slides 213 and the second slides 216 of the tool supports 210 and 211 will partake in such up and down movements, the tool supports 223 will be stabilized against such movements by connection with the piston 226.

The same considerations apply to the centerless method in which the axis of the set of wheels W is maintained at a fixed level by suitable control of the cylinders 133 and 133' by the sensing pins 171 and the hydraulic means operated thereby.

Preferably, the vertical feed movement is controlled by a templet 235 formed by a vertical plate fixed to the tool holder 223, the lower edge of the templet being shaped in conformity with the desired profile of the peripheral surface of the wheel W. A bracket 236' (FIGS. 2 and 23) fixed to and depending from a valve housing 241 carries a horizontal pin 237 extending parallel to the longitudinal central plane 55. A horizontal two-armed sensing lever is pivotally mounted on this pin. The forward arm 238 of this lever engages the profiled edge of the templet 235 whereas the rearward arm 239 of the sensing lever engages the control plunger 240 of the cylindrical slide valve 241 which is slidably guided in a vertical bore of a bracket 236 of slide 213. A depending projection 242 of the valve housing 241 has a horizontal bore through which a stationary rod 243 extends with a sliding fit. The horizontal rod 243 has its ends fixed to the tops of the cylinder blocks 58. Therefore, the housing 241 of the valve and the pivot pin 237 will not be effected by the floating up and down movements of the bed slide 213, whereas they will partake in the longitudinal adjustment of the bed slide 213. The manner in which the valve 240, 241 controls the movement of the pistons 219 and 226 will now be described with reference to FIG. 27 in which the valve housing 241 is shown in reversed position as though its plunger 240 were in direct engagement with the templet 235 in lieu of the indirect connection established by the lever 238, 239. As this templet-controlled valve mechanism effecting the longitudinal feed and the transverse feed of the tool is known in the art and does not form part of my invention, a relatively brief description of its operation will suffice. A pump 250 feeds oil under pressure to the one end of cylinder 220 through a duct 251, while the other end of cylinder 220 is connected with exhaust through pipes 252 and 253 communicating with each other by a throttle valve 254. This valve includes a spring-controlled slidable cylindrical plunger whose position depends upon the pressure prevailing in pipe 251. When this pressure drops, the resistance offered by throttle valve 254 to flow from pipe 252 to pipe 253 will increase thus reducing the velocity of the longitudinal feed effected by piston 219. The pressure prevailing in pipe 251 will drop, however, when the velocity of piston 226 increases. Therefore, the rates of the longitudinal feed and of the transverse feed will be so controlled as to be substantially inverse to each other.

Inward movement of control plunger 240 effected by the sensing lever 238, 239 causes an immediate upward movement of piston 226 compensating and preventing further inward movement. This is due to the fact that inward movement of plunger 240 will be communicated to a valve member 256 operative in its turn to depress a second valve member 257 whereby communication will be established between a branch 258 of the pressure line and both of the ducts 232 and 233. The pressure upon the larger bottom face of piston 226 will overcome the pressure upon the smaller top face of this piston and, consequently, will product upward feed movement of the tool holder 223. As the templet 235 partakes in this movement, the valve member 257 will be closed again and will so reduce the upward feed that the profiled edge of the templet will maintain plunger 240 substantially level thus keeping sensing lever 238, 239 substantially horizontal, while this lever is carried lengthwise of the templet by piston 219.

When the templet permits a spring 260 to move valve member 256 upwardly valve member 257 will likewise move upwardly, whereby duct 233 will be disconnected from duct 232 and will be connected with exhaust port 262 via a passageway 261. Duct 232, however, is in permanent communication with pressure line 258 by a circular groove 263. Therefore, piston 226 will now move downwardly thus depressing again templet 235 and plunger 240 and consequently interrupting again the communication between passageway 261 and port 262.

From the above it will appear that the templet-controlled feed movements of the tools will not be affected by any up and down movements of the floating roller holder and the tool supports carried thereby.

When the up and down movement of each sensing pin 171 is transferred by the Bowden-cable 194 to the templet 235, as shown in FIG. 21, the templet 235 is fixed to a supporting slide 265 slidably mounted on a vertical guideway formed by the tool holder 223. The supporting slide 265 has a projection 266 connected to the internal wire of the cable 194 for displacement thereby, while the sheathing of the cable is fixed to the tool holder 223.

While the sensing pin-controlled means shown in FIG. 21 are illustrated as constituting an embodiment different from that explained with reference to FIGS. 18 and 20, I prefer to provide the bracket 188 with both the valve 193 and the sheathing of Bowden-cable 194, the lever arm 191 being alternatively connectable either with the valve plunger 192 or with the wire of the Bowden-cable. When the lever arm 191 is disconnected from the valve plunger 192 and is connected with the wire of the Bowden-cable, the plunger 192 drops to its lower position in which the duct 135 is connected with the pump 102, while the duct 134 is put on exhaust. Consequently, the roller holder is firmly clamped in position as described hereinabove with reference to the threaded spindles 136. When the peripheries of the wheels W have a non-circular or eccentric shape causing the axle housing B to perform an orbiting movement, the vertical components of these movements will be transferred to the templets 235 by the Bowden-cables. These movements will be superimposed upon the vertical feed movement effected by the longitudinal feed and the profiled edge of the templets. Therefore, the vertical feed movements prescribed by the templets will not be affected by the vertical components of the orbiting movement of the axle housings B.

Alternatively, the templet control may be replaced by a manual control of the vertical feed movements by suitable manipulation of a hand wheel as indicated at 267 in FIG. 1. In this event, the ducts 232 and 233 may be closed by a manually operable valve 269 to thereby lock piston rod 228 in stationary position.

In order to facilitate the adjustment of the center pins 141 of the tail stocks 142 to equal distances from the tool holders 210 and 211 as is desirable to insure that both wheels will have the same diameter upon being re-conditioned, I have provided suitable indicating means each associated with one of the tail stocks 142. These indicating means will now be described with reference to FIG. 26.

A column 270 is mounted on the bottom of frame 14, or 15 respectively and carries a stationary vertical graduated scale 271. A pointer 272 is mounted on an arm 273 fixed to and depending from the flange 154. A vertical scale 274 is connected to the tool holder associated with the tool support 211 and a second pointer 275 which cooperates with the scale 274 is mounted on the stationary scale 271 to indicate the level of the tool carried by the tool holder. The two pairs of scales 271 and 274 serve the purpose of adjusting the two fixed centers 141 to the same level and to indicate the diameter of the wheel during the cutting movement. Since the absolute magnitudes of the diameters of the wheels W are not so important as the equality of these diameters, the graduations do not require any calibration, provided that the values indicated for the one wheel equal those indicated for the other wheel W. A similar measuring mechanism may be coordinated to each of the tail stocks 170.

Having now described my novel under floor lathe and its method of operation, I shall now explain the advantages thereof over the prior art.

FIG. 7 illustrates an underfloor lathe of the type known prior to my invention in which the tool is disposed laterally of the space between the pair of supporting rollers 380 mounted on a slide 381. A wheel-propping jack 382 is disposed between the rollers 380 and a tool slide 383 is provided laterally of one of the rollers 380 and carries the turning tool 384. When the set of wheels has a circular periphery, the tool 384 will properly operate when disposed adjacent to the rollers 380 outside of the space therebetween and will always cut a circular periphery. When the set of wheels, however, has a non-circular peripheral shape as shown in FIG. 7 on an exaggerated scale, other conditions of operation will prevail which will now be briefly explained.

For the purpose of this explanation it will be assumed that the non-circular periphery 385 is composed of a pair of arcs 386 and 386' of equal radii, the centers of these arcs being spaced a distance 388 on the main axis 387. The set of wheels having the peripheries 385 rolls on the pair of driving rollers 380 in the direction indicated by the arrow from position 385 shown by full lines into the position 389 shown by broken lines. During this movement the center of the circular arc 386' will retain its position and the turning tool 384 will cut along an arc of a circle. When the set of wheels, however, continues its rotation beyond the position 389, one of the driving rollers 380 will leave the arc 385 and will enter a circular arc 390. As a result, the center commences to move through the distances 391 and 392. Since but a single circle can intersect three points (FIG. 11) the third point being disposed outside of this circle, when a smaller circle is so placed as to pass through the two other adjacent points while still located within the larger circle, it will be appreciated that in the example of FIG. 7 the periphery 385 will move towards the tool 384 in its further rotation in the direction of the arrow from the position 389 shown by broken lines into the position 393 illustrated by dotted lines and that the periphery 385 will recede from the tool in its further rotation until it assumes the position 385 again shown in full lines. On account of the assumed symmetrical shape of the periphery with respect to its main axis 387, this means that when a non-circular set of wheels rolls upon two stationary rollers 380, irregular shapes are produced in two opposite quadrants (FIG. 8), whereas the two other quadrants will be cut along arcs of a circle about centers which will not move. These irregularities are produced because the centers of the arcs 394 and 395 will move during the cutting operation along the curved path 396, FIG. 7, causing the set of wheels to first move towards the tool and thereafter recede therefrom. This operation will be repeated. The contours 397, 398, 399 indicate the successive cuts. Hence, it will appear that continued cutting operation of this machine will result in a shape increasingly departing from a circle.

In FIG. 9 I have represented a set of wheels turned in accordance with the method illustrated in FIG. 7. The pair of driving and supporting rollers are indicated at 400. The turning tool 401 is disposed outside of this space between the driving rollers adjacent to one of the latter. It is assumed for the purpose of explanation that the original shape of the periphery is represented by the thin line 402 being composed of a pair of circular arcs 403 and of straight connecting lines 405, the center of the arcs being spaced a distance 404. Moreover, the non-circular contour of the wheel has a flattened portion 406 and a bulging portion 407.

When this non-circular wheel rolls on the pair of rollers 400, the cutting edge of the tool 401 will cut along a heavy line 408 showing the following characteristic: Where the original contour between the pair of supporting rollers is circular, the new contour cut by the tool will be likewise circular as shown at 409. Where a contour portion of smaller radius of curvature merges into a portion of larger radius of curvature, a depression will be produced as shown at 410, and where a portion having a larger radius of curvature merges into a portion having a smaller radius of curvature, additional stock will be left on the wheel as shown at 411. In this consideration the corners 412 must be regarded as control portions having small radii of curvature. The dotted line 413 corresponds to a uniform cutting depth extending around the entire contour.

It will be readily appreciated that the peripheral surface thus cut will be more irregular than the original non-circular shape. Moreover, it will be readily appreciated that in the subsequent machining operation in which the new irregular peripheral surface will roll upon the supporting rollers 400 a peripheral surface shape of increasing departure from a circle will be produced. The line 408 has been found by an experiment carried out by means of a model in which the exaggerated non-circular contours were rolled between a pair of rollers, a fixed pen representing the turning tool having drawn the line 408. In FIG. 11 the supporting and driving rollers are designated by 414 and the turning tool by 401. A single circle 416 only can be so placed as to intersect the three points comprising the cutting edge of the turning tool and the two lines of engagement of the wheel with the supporting rollers 414. A smaller wheel 417, whose center will be disposed closer to the supporting rollers, recedes from the turning tool 415, whereas a wheel having a larger diameter, represented by the circle 418, will interfere with the tool 415. FIG. 11, however, will also show that a wheel of smaller diameter will depend between the rollers to a lower level than a wheel of larger diameter. The difference of these levels is indicated at 419.

It will be readily appreciated that the turning tool 401, if disposed between the supporting rollers 414, would cut away stock primarily from the downwardly depending contour section where the cutting depth is a maximum, such depth decreasing gradually and becoming zero where the radius of curvature of the contour is very large. Hence, with this method which is practiced by my novel underfloor lathe the longer main axis will be progressively shortened, whereas the shorter main axis will progressively become longer. In other words, more stock will be left on the contour sections of larger curvature until both main axes of the non-circular periphery will approach equal magnitudes thus rendering the periphery of the wheel more and more circular.

In FIG. 10 I have again assumed that the original non-circular shape is that shown in FIG. 9 being represented by a full line 421. In contrast to FIG. 9, however, the turning tool 401 has been disposed again between the two rollers 423. The heavy line 424 represents the new peripheral surface after the cutting operation. It will appear that more stock will be cut off a wheel of smaller diameter depending to a lower level between the supporting rollers 423 as shown at 425 than from a peripheral section depending to a higher level only. Also it will appear that additional stock will be left on an arc of larger radius owing to the reduction of the cutting depth 426. Here too the tool will cut along the dotted line 427 with uniform cutting depth.

It follows from this representation that the original non-circular shape has been improved owing to the removal of stock where a surplus of stock was present and by the leaving of additional stock where stock was missing. Upon a repeated machining operation the shape of the original non-circular wheel will thus be progressively improved.

As explained with reference to FIGS. 12–15, one of the two peripheral wheel surfaces 37 and 38 formed by the flange and by the tread of the wheel W will be supported by the rollers 32, while the other one of these surfaces is being machined. Hence, one of the two surfaces will always serve to guide the wheel, while the other surface is being cut. Therefore, the shape of the wheel periphery will be improved upon any interchange of the peripheral surface being supported for the peripheral surface being cut. The periphery of each wheel W will become progressively more accurate upon repeated changing operations. Therefore, in my novel method of reconditioning the worn peripheral surfaces 37 and 38 of the flanged wheel W of the railway vehicle in an assembled condition, I place the wheel W on a pair of spaced surfaces of revolution, to wit the peripheral surfaces of the supporting wheels 32, and rotate said surfaces of revolution about their axes machining said peripheral surfaces 37 and 38 at their lowermost points located between the surfaces of revolution. In so doing I place the flange surface 37 on said surfaces of revolution, while machining the tread surface 38 and I placed the tread surface 38 on the surfaces of revolution, while machining the flange surface 37. The operation of relatively axially displacing the wheel W and the supporting rollers 32 is carried out by means of a suitable actuation of the wheel-propping jacks 56–59 and of the slide-moving pistons 61. During this operation, the lost motion between the nut 92 and the lug 63, FIG. 17, may be taken up by the interposition therebetween of a split spacer sleeve (not shown) preventing unnecessary and time-wasting operation of the toggles, when the sides 29 are moved back and forth for the purpose of alternately placing the wheel in the positions of FIGS. 12 and 13, or of FIGS. 14 and 15 respectively.

Owing to the disposition of the shallow groove 39 within the tread-supporting zone 40, 41 of the supporting rollers 33, the ratio of transmission between the rollers 32 and the wheel W will not change considerably, when the wheel W is alternately shifted between the FIG. 12-position and the FIG. 13-position (or the FIG. 14-position and the FIG. 15-position respectively). This is a great advantage because such shifting operation does not require any change of the driving speed of the supporting rollers 32 in order to keep the cutting speed constant. Another advantage is the short length of each supporting roller 32 which is particularly desirable in order to reduce the bending stresses of the shafts 31.

The four supporting and driving wheels 32 will effectively center the set of wheels W by means of their conical faces 42, or 142 respectively, or by means of their shallow narrow grooves 39, respectively. At the same time the supporting rollers will prevent the vehicle from moving in the direction of its travel.

The centerless re-conditioning method explained hereinabove with reference to FIGS. 10 and 11 can be successfully practiced without the control of the pistons 132, 132′ or 226 by the sensing pins 171. In that event the roller holder and the pistons 226 are kept stationary as described hereinabove. A greater accuracy, however, will be obtained in the course of the successive cutting operations after a smaller number of such successive operations, if the roller holder or the tool holders are controlled by the sensing pins 171 to thereby prevent orbiting movements of the axis of the set of wheels W from influencing the distance of the tool cutting edges from the level of such axis. This method permits to re-condition a wheel which, while still in circular peripheral shape, is in an eccentric position with respect to the common axis of the bearing housing B owing to deformation of the wheel axle. In such case the conventional centerless method (in which the roller holder and the pistons 226 are kept stationary, as described hereinabove) is not applicable.

The use of Bowden-cables, such as 194, FIG. 21, for transferring the vertical component of the orbiting movement of the wheel set axis to the tools offers the advantage of simplicity and reliability. The wear of the cables is negligible because of the comparatively low number of revolutions of the wheels W per minute resulting in a low frequency of the reciprocatory movement to be transferred by the cable. The length of the cable must be so chosen that it will not hinder the feed movements of the tool holder 223.

As the supporting and driving rollers 32 hold the set of wheels W at a level higher than that of the track, the pressure exerted by the set of wheels upon the rollers 32 is increased accordingly. This is desirable in order to ensure a high driving friction even where the peripheral surfaces of the wheels W may be soiled with oil or grease. The high friction offers the advantage, however, that the tools may take a heavy cut.

In the centerless re-conditioning operation the axis of the set of wheels W has no definite fixed position affording a possibility of measuring the diameter of the wheel surfaces 37, 38. In fact, the position of the axis is indefinite and varies depending on the diameter of the peripheral surfaces of the wheel. It changes even during any revolution of the set of wheels, whereby measuring the diameter is rendered difficult. It is very important, however, that both wheels W of a set should be given equal diameters in the re-conditioning operation since any differences in diameters will give rise to trouble.

The mounting of the auxiliary rails 53 on the same slides 29, which carry the supporting and driving rollers, is of great advantage. It results in a compact structure, in a reliable bracing of the vehicle and in a simplified and time-consuming operation of the lathe.

The advantages of the invention as here outlined are best realized, when all of its features and instrumentalities are combined in one and the same structure, but a useful lathe may be produced embodying less than all of these features.

It will be obvious to those skilled in the art to which the invention appertains that the same may be incorporated in several different constructions. The accompanying drawing, therefore, is submitted merely as showing the preferred exemplification of the invention.

More particularly, the mechanism controlled by the sensing pins 171 need not necessarily be of hydraulic character but may be constructed otherwise.

What I claim is:

1. In an underfloor lathe for machining the peripheral surface of a wheel of a railway vehicle in assembled condition, the combination comprising a roller holder, a pair of rollers mounted thereon for rotation about parallel horizontal axes to engage and support said wheel, driving means connected with said rollers for imparting rotation thereto to thereby turn said wheel, a tool holder disposed between said rollers for supporting a cutting tool so as to engage said wheel below its axis, a movable jack carrying one of said holders for vertical movement, adjustable means for keeping the other one of said holders at a fixed but adjustable level, a stationary bracket, sensing means mounted on said bracket and coordinated to the axle of said wheel for sensing the level at which the rotary axis of said wheel is located, and means controlled by said sensing means and connected with said jack to effect movement of said jack thereby to move said one of said holders so as to maintain the vertical distance between said cutting tool and said level constant, while said wheel is turned by said rollers, irrespective of a non-circular condition of the periphery of said wheel.

2. In an underfloor lathe for machining the peripheral surface of a wheel of a railway vehicle in assembled condition, the combination comprising a roller holder, a pair of rollers mounted thereon for rotation about parallel horizontal axes to engage and support said wheel, driving means connected with said rollers for imparting rotation thereto to thereby turn said wheel, a movable jack carrying said roller holder for vertical movement, a stationary bracket, sensing means mounted on said bracket and coordinated to the axle of said wheel for sensing the level at which the rotary axis of said wheel is located, means controlled by said sensing means and connected with said jack to effect movement of said jack thereby to effect vertical movement of said roller holder to maintain said wheel with its axis at a constant level, while said wheel is turned by said rollers, irrespective of a noncircular condition of the periphery of said wheel, a tool holder disposed between said rollers for supporting a cutting tool so as to engage said wheel below its axis, and stationary adjustable means below said tool holder for connection thereto to keep the same at a fixed but adjustable level irrespective of said vertical movement of said roller holder.

3. In an underfloor lathe for machining the peripheral surface of a wheel of a railway vehicle in assembled condition, the combination comprising a roller holder, a pair of rollers mounted thereon for rotation about parallel horizontal axes to engage and support said wheel, driving means connected with said rollers for imparting rotation thereto to thereby turn said wheel, adjustable means for maintaining said roller holder at a fixed but adjustable level, a stationary bracket, sensing means mounted on said bracket and coordinated to the axle of said wheel for sensing, as said wheel rotates vertical displacements of the level at which the rotary axis of said wheel is located caused by a non-circular condition of the periphery of said wheel, a tool holder disposed between said rollers for supporting a cutting tool so as to engage said wheel below its axis, a movable jack carrying said tool holder for vertical movement, and means controlled by said sensing means and connected with said jack to effect movement of said jack and thereby vertical movement of said tool holder to maintain the distance of said cutting tool from said level constant.

4. The combination claimed in claim 1 in which said jack comprises a hydraulically-operated ram, said means controlled by said sensing means includes a valve hydraulically connected to said jack for controlling the direction of its movement.

5. The combination claimed in claim 1 further comprising tool supporting means composed of a horizontal slide mounted for movement parallel to the axis of said wheel and of a vertical slide, one of said slides being mounted on said roller holder and carrying the other one, feeding means connected to said vertical slide, and templet control means mounted on one of said slides and operable by movement of said horizontal slide to control said feeding means in conformity with the profile shape of said periphery.

6. In an underfloor lathe for machining the peripheral surface of a flanged wheel of a railway vehicle in assembled condition which wheel has a peripheral flange surface of larger diameter than its peripheral tread surface, the combination claimed in claim 1 in which each of said rollers has two adjacent, axially-displaced, different peripheral zones for alternative selective supporting engagement with said flange surface and with said tread surface of said wheel, said combination further comprising means for axially displacing said rollers on said roller holder between a position in which one of said zones is in operative supporting engagement with the flange surface of said wheel and another position in which the other one of said zones is in operative supporting engagement with the tread surface of said wheel.

7. The combination claimed in claim 6 in which the one of said peripheral zones for the supporting engagement with said flange surface of said wheel is the surface of a peripheral groove provided in each roller axially within a relatively wide surface constituting the other one of said peripheral zones for the supporting engagement with said tread surface of said wheel.

8. In an underfloor lathe for machining the peripheral surfaces of a set of coaxial wheels of a railway vehicle in assembled condition, the combination comprising a roller holder, two pairs of rollers mounted thereon for rotation about parallel horizontal axes to engage and support said wheels, each of said pairs supporting one of said wheels, driving means connected with said rollers for imparting rotation thereto to thereby turn said wheels, means for mounting said roller holder for up and down movement, pressure exerting means connected to said roller holder for imparting up and down movement thereto to maintain frictional engagement of said rollers with said wheels irrespective of a non-circular condition of the peripheries thereof, when the axis of rotation of said wheels is kept stationary, said roller holder being provided with a guide-way extending substantially parallel to said horizontal axes, a pair of slides on said guideway, means on each said slides to form a substantially vertical guide-way, a tool holder mounted on said vertical guide-way, said slides and said guide-ways being so disposed as to afford movability of each tool holder to a position below one of said wheels and between said pair of rollers supporting such wheel, stationary means mounted below said tool holder, and adjustable means for bracing said tool holder against said stationary means to thereby render said tool holder independent of said up and down movements of said holder.

9. The combination claimed in claim 3 in which said adjustable means for maintaining said roller holder at a fixed but adjustable level comprise hydraulic units each composed of cylinder and piston and mounted in fixed position and connected to said roller holder for exerting a downward pressure thereon, and upright threaded spindles mounted in said roller holder for adjustment in axial direction and extending downwardly therefrom into engagement with a fixed base surface for bracing said roller holder against said pressure.

10. In an underfloor lathe for re-conditioning the worn peripheral surfaces of a pair of coaxial wheels of a railway vehicle in assembled condition, the combination comprising a roller holder, two pairs of rollers mounted thereon for rotation about parallel horizontal axes to support said wheels, each of said pairs supporting one of said wheels at spaced points on either side of a vertical radial plane of said set of coaxial wheels, driving means connected with said rollers for imparting rotation thereto to thereby turn said wheels, said roller holder being provided with a substantially horizontal guide-way extending substantially parallel to said plane, a pair of slides on said guide-way, a tool holder carried by each of said slides, said slides and said guide-ways being so disposed as to afford movability of each tool holder to a position below one of said wheels substantially within said plane, and a pair of jacks, each being mounted below one of said wheels for engaging and lifting same above and lowering it for placement upon said rollers, each of said jacks being movable to a position located below the path described by said slides and said tool holders and said slides and said tool holders being movable on said guide-way to positions located between the paths of said jacks.

11. In an underfloor lathe for re-conditioning the worn peripheral surface of a flanged wheel of a railway vehicle in assembled condition which wheel has a peripheral flange surface of larger diameter than its peripheral tread surface, the combination comprising a roller holder, a pair of rollers mounted thereon for rotation about parallel horizontal axes to engage and support said wheel, said horizontal axes being disposed at substantially the same level on either side of a vertical radial plane of said flanged wheel, driving means connected with said rollers for imparting rotation thereto to thereby turn said wheel, each of said rollers having a relatively wide peripheral surface for supporting engagement with said tread surface of said wheel and a relatively narrow and shallow peripheral groove provided within said relatively wider peripheral surface for alternative supporting engagement with said flange surface of said wheel.

12. The combination claimed in claim 11 in which said roller has a conical surface adjacent to said relatively wide peripheral surface for abutting engagement with a side of said flange surface to prevent axial movement of said wheel relative to said roller in one direction.

References Cited by the Examiner

UNITED STATES PATENTS

| | | | |
|---|---|---|---|
| 598,155 | 2/98 | Lewis et al. | 82—8 |
| 1,522,674 | 1/25 | Fickett | 82—8 |
| 2,044,497 | 6/36 | Schlitz | 82—1 |
| 2,268,983 | 1/42 | Gilmore et al. | 82—1 |
| 2,497,690 | 2/50 | Roberts | 82—40 |
| 2,622,374 | 12/52 | Stanley | 51—236 X |
| 2,699,084 | 1/55 | Ovshinsky | 82—40 |
| 2,746,683 | 5/56 | McLoren | 235—103.5 |
| 2,837,000 | 6/58 | Dombrowski | 82—14 |
| 2,874,900 | 2/59 | Linderman | 235—103.5 |
| 2,977,833 | 4/61 | Lelan | 82—14 |

WILLIAM W. DYER, JR., *Primary Examiner.*

RICHARD H. EANES, JR., LEON PEAR, *Examiners.*